United States Patent
Nardini et al.

(10) Patent No.: US 11,627,640 B2
(45) Date of Patent: Apr. 11, 2023

(54) REMOTE LPWAN GATEWAY WITH BACKHAUL OVER A HIGH-LATENCY COMMUNICATION SYSTEM

(71) Applicant: FLEET SPACE TECHNOLOGIES PTY LTD, Beverley (AU)

(72) Inventors: Flavia Tata Nardini, Beverley (AU); Matthew Pearson, Beverley (AU); Sabooh Ajaz, Beverley (AU)

( * ) Notice: Subject to any disclaimer, the term of this patent is extended or adjusted under 35 U.S.C. 154(b) by 70 days.

(21) Appl. No.: 16/958,944

(22) PCT Filed: May 9, 2019

(86) PCT No.: PCT/AU2019/050429
§ 371 (c)(1),
(2) Date: Jun. 29, 2020

(87) PCT Pub. No.: WO2020/113256
PCT Pub. Date: Jun. 11, 2020

(65) Prior Publication Data
US 2020/0344847 A1    Oct. 29, 2020

(30) Foreign Application Priority Data

Dec. 7, 2018  (AU) ................................ 2018904671
Jan. 22, 2019 (AU) ................................ 2019200432

(51) Int. Cl.
*H04W 88/16* (2009.01)
*H04B 7/185* (2006.01)
(Continued)

(52) U.S. Cl.
CPC ........ *H04W 88/16* (2013.01); *H04B 7/18591* (2013.01); *H04B 7/195* (2013.01);
(Continued)

(58) Field of Classification Search
CPC ....... H04W 88/16; H04W 4/70; H04W 84/18; H04W 88/04; H04W 4/021; H04W 4/00;
(Continued)

(56) References Cited

U.S. PATENT DOCUMENTS 10,007,513 B2   6/2018  Malladi et al.
10,305,646 B2 *  5/2019  Hreha ................... H04W 84/06
(Continued)

FOREIGN PATENT DOCUMENTS

| CN | 107819675 A | 3/2018 |
|---|---|---|
| EP | 3208950 A1 | 8/2017 |

OTHER PUBLICATIONS

Extended European Search Report for Application No. 19892791.5 dated Jan. 26, 2021, 7 pgs.
(Continued)

*Primary Examiner* — Ajit Patel
*Assistant Examiner* — Wilfred Thomas
(74) *Attorney, Agent, or Firm* — Kowert, Hood, Munyon, Rankin & Goetzel, P.C.

(57) ABSTRACT

A terrestrial data communication gateway device for satellite communication comprising: at least one processor; memory accessible to the at least one processor; a LPWAN wireless communication subsystem for communication with multiple remote devices; a satellite communication subsystem for communication with at least one low earth orbit satellite. The memory stores program code executable by the processor to cause the processor to: perform server functions in relation to the multiple remote devices, and configure an edge computing module to perform data processing operations on signals received by the LPWAN communication subsystem. The data processing operations comprise compression of data received by the LPWAN communication subsystem to generate a compressed payload for transmis-
(Continued)

sion by the satellite communication subsystem. The memory comprises a backhaul scheduling module to schedule communication of a transmission by the satellite communication subsystem to the low earth orbit satellite.

20 Claims, 17 Drawing Sheets

(51) Int. Cl.
*H04B 7/195* (2006.01)
*H04L 12/66* (2006.01)
*H04W 4/70* (2018.01)
*H04W 84/18* (2009.01)
*H04W 88/04* (2009.01)

(52) U.S. Cl.
CPC .............. *H04L 12/66* (2013.01); *H04W 4/70* (2018.02); *H04W 84/18* (2013.01); *H04W 88/04* (2013.01)

(58) Field of Classification Search
CPC ...... H04W 4/02; H04W 4/50; H04B 7/18591; H04B 7/195; H04B 7/18578; H04B 7/18517; H04L 12/66; H04L 69/04; H04L 65/102; H04L 67/025; Y02D 30/70
See application file for complete search history.

(56) References Cited

U.S. PATENT DOCUMENTS

| | | | |
|---|---|---|---|
| 10,419,107 B2* | 9/2019 | Qin | H04W 28/085 |
| 10,574,341 B1* | 2/2020 | Liang | H04W 72/0453 |
| 11,032,762 B1* | 6/2021 | Wild | H04W 52/0229 |
| 2016/0204852 A1* | 7/2016 | Grant | H04W 72/082 |
| | | | 370/252 |
| 2018/0212787 A1* | 7/2018 | Lee | H04L 43/0817 |
| 2019/0226898 A1* | 7/2019 | Gray, Jr. | H04W 84/18 |
| 2019/0373081 A1* | 12/2019 | Jung | H04L 67/327 |
| 2019/0394172 A1* | 12/2019 | Hersent | H04L 9/0861 |
| 2020/0287726 A1* | 9/2020 | Garnier | H04L 67/28 |
| 2020/0327805 A1* | 10/2020 | Jarratt | E01F 9/608 |
| 2021/0127225 A1* | 4/2021 | Viitala | G01S 5/0252 |

OTHER PUBLICATIONS

L Ysogor, T. et al., 'Survey of Data Exchange Formats for Heterogeneous LPWAN-Satellite IoT Networks', 2018 Moscow Workshop on Electronic and Networking Technologies (MWENT), Mar. 14-16, 2018 [retrieved from the Internet on Feb. 20, 2019] U RL:https ://ieeexplore. ieee. org/ abstract/ document/83 3 725 7.

International Search Report and Written Opinion for International Application No. PCT/AU19/050429 dated Aug. 12, 2019, 18 pgs.

* cited by examiner

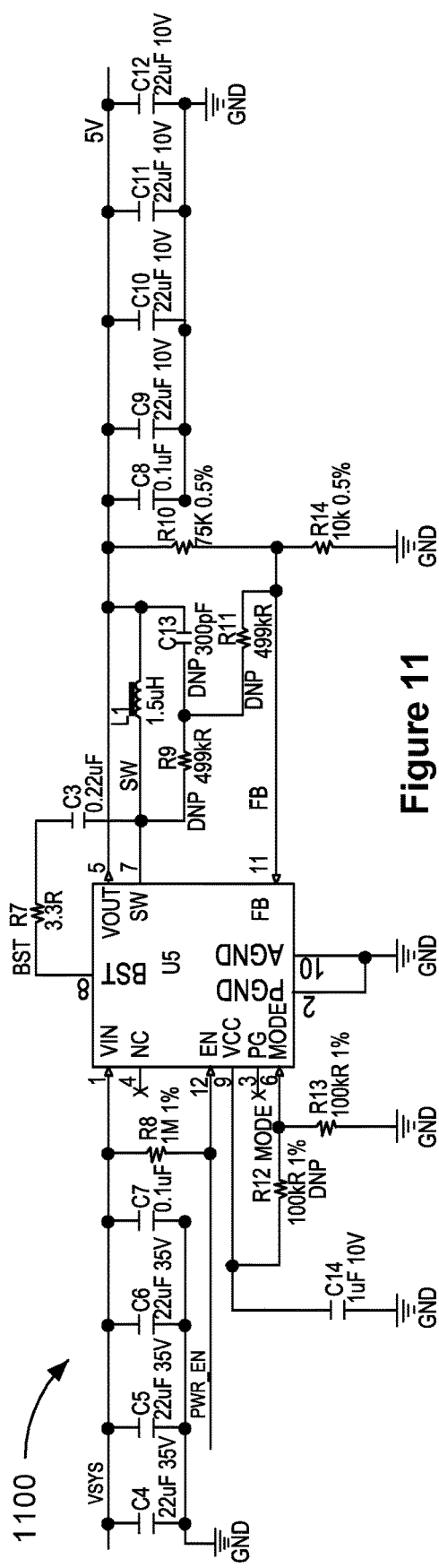
Figure 11
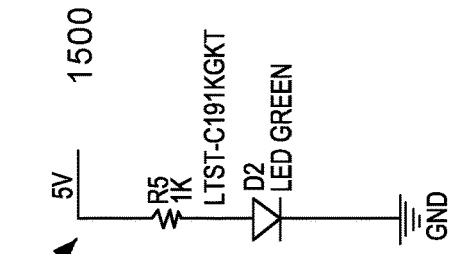
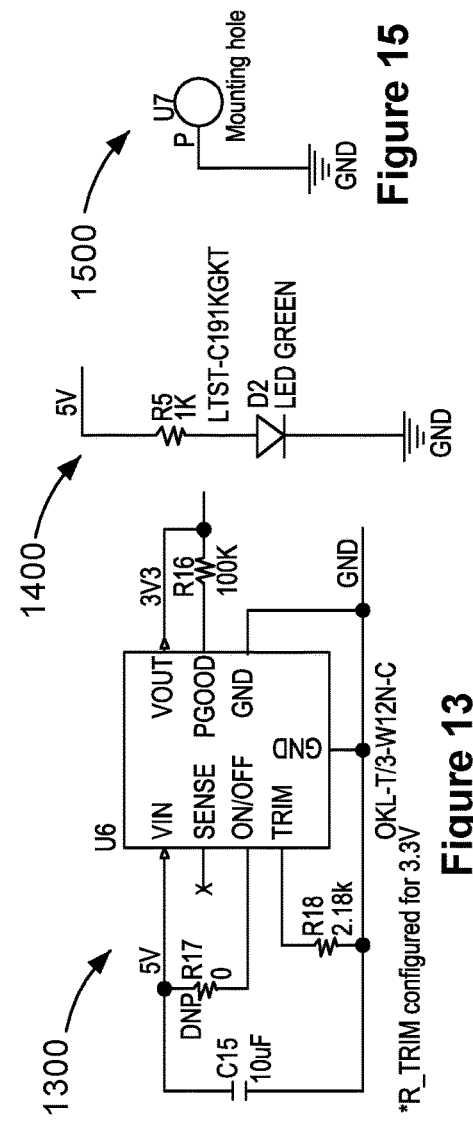
Figure 13
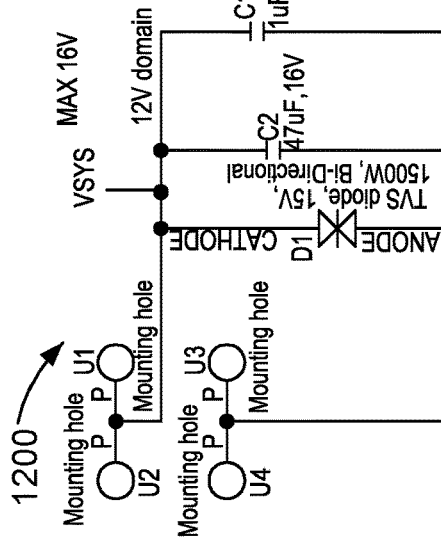
Figure 12
Figure 14
Figure 15

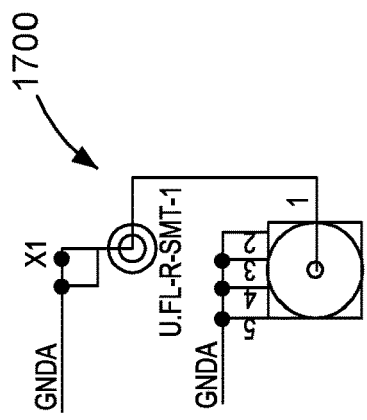
Figure 17
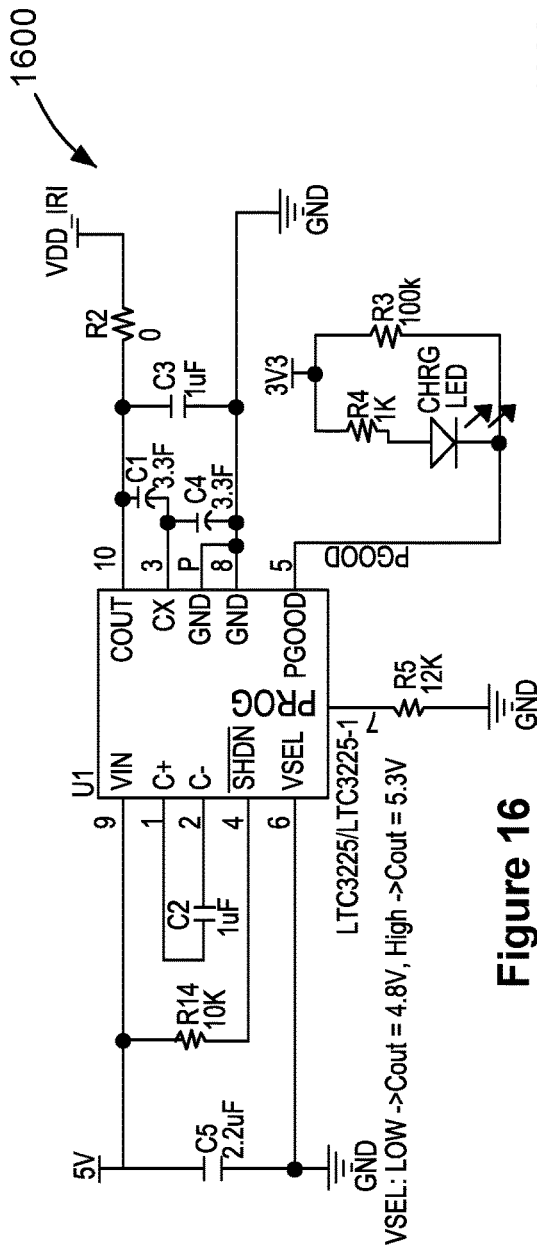
Figure 16
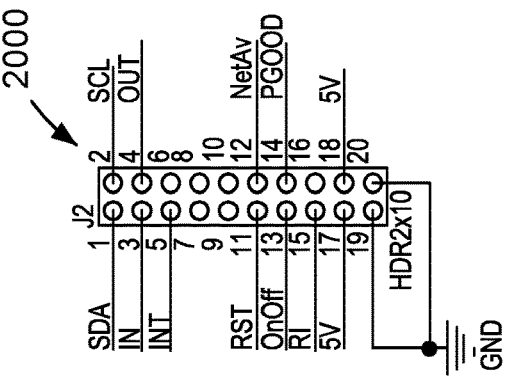
Figure 20
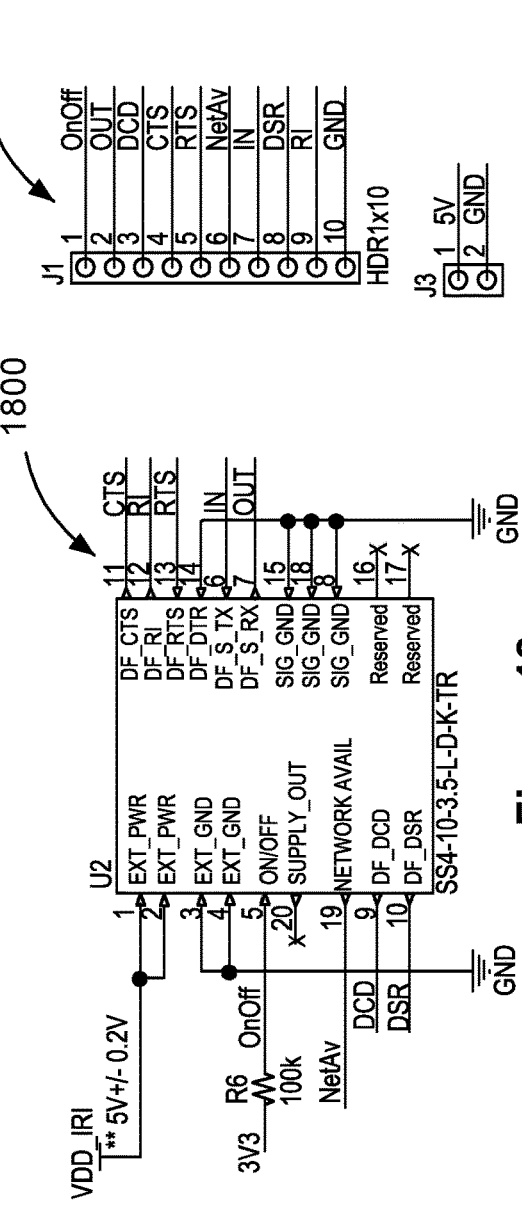
Figure 19
Figure 18

REMOTE LPWAN GATEWAY WITH BACKHAUL OVER A HIGH-LATENCY COMMUNICATION SYSTEM

TECHNICAL FIELD

Embodiments relate to gateway devices providing high-latency backhaul capability for edge devices located remotely.

BACKGROUND

Positioning sensors in remote environments may provide beneficial information in various economic or environmental contexts. For example, in a remote mining operation, information from sensors positioned in remotely located machinery may be beneficial for managing and improving the remote mining operation. Similarly for a remotely located farm, information from various sensors positioned on livestock or sensors positioned on the ground may be beneficial in managing and planning operations at the remotely located farm.

Access to information from remote environments presents several technical challenges. In remote environments, there may be significant connectivity and power supply issues. Prior sensor networks and gateways may not provide reliable and rich access to information generated by sensors positioned in remote environments because of lack of connectivity and power. If connectivity is possible, for example via a satellite uplink, then the cost of using such an uplink is typically prohibitively high for many sensor deployment scenarios.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

Some embodiments relate to a terrestrial data communication gateway device for satellite communication comprising:
    at least one processor;
    memory accessible to the at least one processor;
    a low power wide area network (LPWAN) wireless communication subsystem responsive to the at least one processor to allow wireless communication with multiple remote devices;
    a satellite communication subsystem to allow wireless communication with at least one orbiting satellite;
    wherein the memory stores program code executable by the at least one processor to cause the at least one processor to perform server functions in relation to the multiple remote devices.

Some embodiments relate to a gateway server device comprising at least one processor, memory and communication subsystems configured for low power wide area network (LPWAN) terrestrial communication and for satellite communication to enable high latency communication between multiple remote devices and a remote server via a satellite.

Some embodiments relate to a gateway device comprising:
    at least one processor;
    a memory accessible to the at least one processor;
    an edge device communication interface;
    a satellite communication interface;
    wherein the memory comprises executable modules, the executable modules comprising instructions that, when executed by the at least one processor, cause the at least one processor to:
    receive signals from at least one or multiple edge device (s) via the edge device communication interface over a low power wide area network;
    process the received signals to determine data received from the at least one edge device; and
    transmit the determined data using a high latency protocol to at least one satellite via the satellite communication interface.

The transmission of determined data to at least one satellite via the satellite communication interface may comprise a high-latency transmission. The high-latency transmission may comprise a store and forward transmission. The high-latency transmission may comprises a short burst data transmission.

The LPWAN may be implemented using a LoRaWAN protocol or a Sigfox protocol.

The gateway device and the edge or remote devices may be configured to use a same network key to encrypt and decrypt communication between the gateway device and each of the multiple edge or remote devices.

Some embodiment relate to communication systems including the gateway device, one or more edge devices and one or more satellite systems in communication with each other.

In some embodiments, each of the multiple remote or edge devices may comprise at least one sensor to determine an environment property of a local environment of respective edge or gateway device.

In some embodiments, each of the edge or remote devices may be configured to transmit a data packet encoding the determined environment property to the gateway device.

In some embodiments, the satellite communication subsystem may implement part of a backhaul network to make the transmitted a data packet encoding the determined environment property accessible through a remotely located client device.

In some embodiments, each of the remote or edge devices may comprise at least one actuator to control a remote machine component.

In some embodiments, the remote or edge devices may be configured to receive a data packet encoding instructions to control the remote machine component and actuate the remote machine component based on the received instructions.

In some embodiments, the satellite communication subsystem may implement part of a backhaul network to communicate a data packet encoding instructions to control the remote machine component, from a remotely located client device.

Some embodiments relate to methods of communication between one or more edge devices and a gateway device or between a gateway device and one or more satellite systems, wherein the gateway device processes messages to be communicated between the one or more edge devices and the satellite systems to cut message data overhead from the messages before sending those messages. The methods involve using the gateway device as a message server, with the gateway device communicating with the one or more edge devices using a LPWAN protocol and wherein the gateway device communicates with the one or more satellite systems using a high-latency backhaul link. Some embodiments relate to, in a terrestrial data communication gateway device for satellite communication having at least one processor and memory accessible to the at least one processor, a method comprising:

operating a low power wide area network (LPWAN) wireless communication subsystem responsive to the at least one processor to allow wireless communication with multiple remote devices;

operating a satellite communication subsystem to allow wireless communication with at least one orbiting satellite; and operating the at least one processor to perform server functions in relation to the multiple remote devices.

Some embodiments relate to a terrestrial data communication gateway device for satellite communication comprising: at least one processor; memory accessible to the at least one processor; a low power wide area network (LPWAN) wireless communication subsystem responsive to the at least one processor to allow wireless communication with multiple remote devices; a satellite communication subsystem to allow wireless communication with at least one low earth orbit satellite; and wherein the memory stores program code executable by the at least one processor to cause the at least one processor to: perform server functions in relation to the multiple remote devices, and configure an edge computing module to perform data processing operations on signals received by the LPWAN wireless communication subsystem, the data processing operations comprising compression of data received by the LPWAN wireless communication subsystem to generate a compressed payload for transmission by the satellite communication subsystem.

Some embodiments relate to a terrestrial data communication gateway device for satellite communication comprising: at least one processor; memory accessible to the at least one processor; a low power wide area network (LPWAN) wireless communication subsystem responsive to the at least one processor to allow wireless communication with multiple remote devices; a satellite communication subsystem to allow wireless communication with at least one low earth orbit satellite; and wherein the memory stores program code executable by the at least one processor to cause the at least one processor to configure a backhaul scheduling module to schedule communication of a transmission by the satellite communication subsystem to the low earth orbit satellite, the transmission comprising data received by the LPWAN wireless communication subsystem.

In some embodiments, the memory is configured to buffer data received from the multiple remote devices before transmission by the satellite communication subsystem in the memory.

In some embodiments, the transmission scheduled by the backhaul scheduling module comprises the data stored in the buffer in the memory.

In some embodiments, the server functions in relation to the multiple remote devices comprise one or more of: registration of the multiple remote devices with the gateway device; allocation of a communication frequency to each remote device; de-duplication of data received from the multiple remote devices; and implementation of a preamble, header and cyclic redundancy checks at a MAC (media access control) layer for wireless communication with the multiple remote devices.

In some embodiments, the program code is executable by a processor to configure an encryption module to: encrypt data before transmissions by the LPWAN wireless communication subsystem; and decrypt data in signals received by the LPWAN wireless communication subsystem.

In some embodiments, the LPWAN wireless performs communication using a LoRaWAN protocol or a Sigfox protocol.

In some embodiments, the satellite communication subsystem is configured for receiving from the low earth orbit satellite a first edge computing code module, and storing in memory the received first edge computing code module, wherein the first edge computing code module is executable by the processor to perform data processing operations on data received by the LPWAN wireless communication subsystem to determine a first edge computing code module output.

In some embodiments, the satellite communication subsystem is configured to receive from the low earth orbit satellite first configuration parameters, store in memory the received first configuration parameters, wherein the first configuration parameters are accessible by the processor to determine execution of the first edge computing code module.

In some embodiments, the satellite communication subsystem is configured to receive from the low earth orbit satellite a second edge computing code module, and store in memory the received second edge computing code module, wherein the second edge computing code module is executable by the processor to perform data processing operations on data received by the LPWAN wireless communication subsystem to determine a second edge computing code module output.

In some embodiments, the satellite communication subsystem is configured to receive second configuration parameters for the second edge computing code module, and store in memory the received second configuration parameters, wherein the second configuration parameters are accessible by the processor to determine execution of the second edge computing code module and to determine a relationship between the first edge computing code module with the second edge computing code module.

In some embodiments, the processor is configured to determine an edge data processing function based on the relationship between the first edge computing code module and the second edge computing code module to process data received by the LPWAN wireless communication subsystem to determine an edge data processing function output.

In some embodiments, the edge computing code module comprises one or more of a logical, arithmetic, statistical or scientific operation executable by the processor with data received by the LPWAN wireless communication subsystem as an input.

In some embodiments, the satellite communication subsystem transmits the determined first edge computing code module output, or second edge computing code module output or an edge data processing function output to the low earth orbit satellite.

In some embodiments, the first edge computing code module is a geo-fencing code module, the first configuration parameters comprise a definition of an extent of a geo-fence, the wireless communication subsystem receives location data from the multiple remote devices, and the first edge computing code module is executable by the processor to determine an alert transmittable by the satellite communication subsystem on transgression of the geo-fence.

In some embodiments, transmission by the satellite communication subsystem is configured for prolonged persistence for high latency communication.

Some embodiments relate to a communication system including the gateway device, multiple edge or remote devices and one or more satellite systems in communication with each other, wherein the gateway device acts as an intermediate server between the one or more edge devices and the one or more satellite communication systems.

In some embodiments, each of the multiple remote or edge devices comprises at least one sensor to determine an environment property of a local environment of respective edge or gateway device.

In some embodiments, each of the edge or remote devices is configured to transmit a data packet encoding the determined environment property to the gateway device.

In some embodiments, the satellite communication subsystem implements part of a backhaul network to make the transmitted data packet encoding the determined environment property accessible through a remotely located client device.

In some embodiments, the remote or edge devices comprise at least one actuator to control a remote machine component. In some embodiments, the remote or edge devices are configured to receive a data packet encoding instructions to control the remote machine component and actuate the remote machine component based on the received instructions. In some embodiments, the satellite communication subsystem implements part of a backhaul network to communicate a data packet encoding instructions to control the remote machine component, from a remotely located client device.

In some embodiments, the core server further comprises: at least one core server processor; core server memory accessible to the at least one core server processor; wherein the core server memory comprises an edge computing code module library storing one or more edge computing code modules, and the core server memory stores program code executable by the at least one core server processor to configure an edge computing management module to transmit the one or more edge computing code module to the gateway device.

In some embodiments, the edge computing management module is configured to receive program code from a client device for inclusion in the edge computing code module library.

In some embodiments, the edge computing management module performs pre-publication verification of program code before inclusion into the edge computing code module library.

In some embodiments, the program code in the core server memory is executable by the at least one core server processor to configure a user credit and quota management application that tracks the volume and frequency of data accessed by the gateway device in the communication system in relation to user accounts stored in the core server memory.

In some embodiments, the program code in the core server memory is executable by the at least one core server processor to configure a data presentation and application programming interface application (API) to make data the gateway device available to the client device.

Some embodiments relate to a method of edge computing using a gateway device, the gateway device comprising: at least one processor; memory accessible to the at least one processor; a low power wide area network (LPWAN) wireless communication subsystem responsive to the at least one processor to allow wireless communication with multiple remote devices; a satellite communication subsystem to allow wireless communication with at least one low earth orbit satellite; and the memory storing program code instructions for: receiving by the satellite communication subsystem, from a low earth orbit satellite a first edge computing code module, storing in memory the received first edge computing code module, executing the first edge computing code module by the at least one processor to perform data processing operations on data received by a LPWAN wireless communication subsystem to determine a first edge computing code module output.

In some embodiments, the method of edge computing further comprises: receiving by the satellite communication subsystem, from the low earth orbit satellite first configuration parameters, storing in memory the received first configuration parameters, wherein the first configuration parameters are accessible by the at least one processor to determine execution of the first edge computing code module.

In some embodiments, the method of edge computing further comprises: receiving by the satellite communication subsystem, from the low earth orbit satellite a second edge computing code module, and storing in memory the received second edge computing code module, executing by the at least one processor, the second edge computing code module to perform data processing operations on data received by the LPWAN wireless communication subsystem to determine a second edge computing code module output.

In some embodiments, the method of edge computing further comprises: receiving by the satellite communication subsystem second configuration parameters for the second edge computing code module, and storing in memory the received second configuration parameters, wherein the second configuration parameters are accessible by the at least one processor to determine execution of the second edge computing code module and to determine a relationship between the first edge computing code module with the second edge computing code module.

In some embodiments, the method of edge computing further comprises: determining by the at least one processor, edge data processing instructions based on the relationship between the first edge computing code module and the second edge computing code module, processing data received by the LPWAN wireless communication subsystem using the determined edge processing instructions to obtain an edge data processing output.

In some embodiments, the edge computing code module comprises one or more of a logical, arithmetic, statistical or scientific operation executable by the processor with data received by the LPWAN wireless communication subsystem as an input.

In some embodiments, the method of edge computing further comprises: transmitting by the satellite communication subsystem the determined first edge computing code module output, or the second edge computing code module output or an edge data processing output to the low earth orbit satellite.

Some embodiments relate to a method for satellite communication using a gateway device, the gateway device comprising:

providing at the gateway device a low power wide area network (LPWAN) wireless communication subsystem to allow wireless communication with multiple remote devices;

providing at the gateway device a satellite communication subsystem to allow wireless communication with at least one low earth orbit satellite;

performing at the gateway device server functions in relation to the multiple remote devices; and configuring in the gateway device an edge computing module to perform data processing operations on signals received by the LPWAN wireless communication subsystem, the data processing operations comprising compression of data received by the LPWAN wireless communication subsystem to generate a compressed payload for transmission by the satellite communication subsystem.

Some embodiments relate to a method for satellite communication using a gateway device, the gateway device comprising:

providing at the gateway device a low power wide area network (LPWAN) wireless communication subsystem to allow wireless communication with multiple remote devices;

providing at the gateway device a satellite communication subsystem to allow wireless communication with at least one low earth orbit satellite;

performing at the gateway device server functions in relation to the multiple remote devices; and configuring at the gateway device a backhaul scheduling module to schedule communication of a transmission by the satellite communication subsystem to the low earth orbit satellite, the transmission comprising data received by the LPWAN wireless communication subsystem.

BRIEF DESCRIPTION OF DRAWINGS

FIG. 11 is a circuit layout diagram of a part of a power management circuit forming part of a satellite communication modem;

FIG. 12 is a circuit layout diagram of a part of the power management circuit forming part of the satellite communication modem;

FIG. 13 is a circuit layout diagram of a part of the power management circuit forming part of the satellite communication modem;

FIG. 14 is a circuit layout diagram of a part of the power management circuit forming part of the satellite communication modem;

FIG. 15 is a circuit layout diagram of a part of the power management circuit forming part of the satellite communication modem;

FIG. 16 is a circuit layout diagram of part of a supercapacitor charger forming part of the satellite communication modem;

FIG. 17 is a circuit layout diagram part of a radio frequency connector forming part of the satellite communication modem;

FIG. 18 is a circuit layout diagram of part of a short burst data only transceiver forming part of the satellite communication modem;

FIG. 19 is a circuit layout diagram of a header block forming part of the satellite communication modem;

FIG. 20 is a circuit layout diagram of another header block forming part of the satellite communication modem;

DETAILED DESCRIPTION

Figure 1:
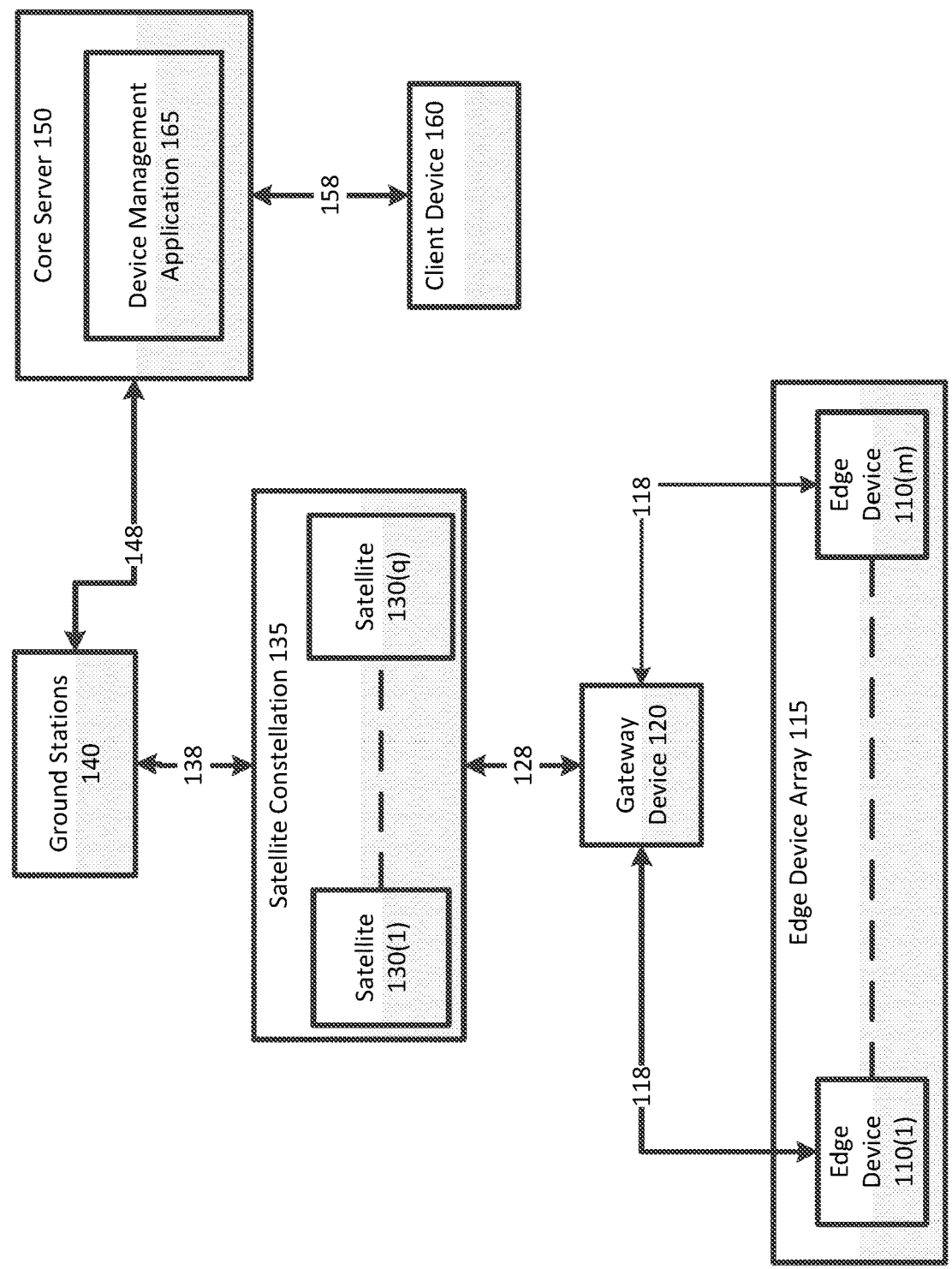
FIG. 1 is a block diagram of a remote backhaul system according to some embodiments.

Embodiments described herein relate generally to gateway devices that provide backhaul services and server functions for sensor devices or edge devices or nodes positioned in remote environments. Backhaul services comprise the provision of communication links and pathways between remotely located edge devices and a backbone network that is more broadly accessible, for example via the Internet. Backhaul services enable connectivity of the remotely located sensor devices generating information via a gateway device to the backbone network through which the generated information from the remote sensors devices may be easily accessed. Server functions performed by the gateway devices comprise any of: the administration of the remotely located edge devices, including registration, tracking, communication intermediation, optimisation, receiving status information, maintaining edge device state, provision of encryption services, signal processing services, data pre-processing services or edge computing services, managing configuration of those pre-processing or edge computing services, data compression and packaging services, for example.

In some embodiments, the gateway device may facilitate or act as a part of an "internet of things" (IoT) network. In the internet of things network, the sensor devices or edge devices may be viewed as representative of "things" that form part of the network.

The gateway device is connected to the edge devices over a low power wide area network (LPWAN). The low power wide area network is a wireless communication network. The LPWAN may comprise a network of devices that is spread across a radius of 15 km (relative to the gateway device), for example. In some embodiments, multiple gateway devices may be deployed adjacently (i.e. separated by a distance that is less than the communication limit) to further extend the network. Adjacent gateway devices may be separated from each other by a distance ranging from 5 to 15 km, for example.

Communications over the LPWAN may involve lower data transfer rates or bandwidth in comparison to conventional mobile phone networks, for example data communication rates of less than 1 megabytes per second. In some embodiments, the data transfer rate of an LPWAN could be in the range of 0.1 to 50 kilobytes per second per radio communication channel. The radio frequency power emitted by edge devices that communicate over the LPWAN may be in the range of 10 to 25 milliwatts or 10 to 500 milliwatts or 10 milliwatts to 1 watt, for example. The low data rates and low radio frequency power allow for a reduced overall power consumption or demand, allowing an edge device to operate on low power for prolonged periods. Edge devices may be powered with batteries alone or batteries in combination with a local energy harvesting subsystem, such as solar cells. LPWAN communication may occur over publically available radiofrequency spectrum bands.

The gateway devices described herein may be used to provide communications backhaul services for industrial control networks to facilitate communications with remotely located industrial control sensors and actuators, for example. The gateway devices described herein may be used to provide communications backhaul services for precision agriculture systems to facilitate communications with remotely located agricultural sensors or control systems, for example. The gateway devices described herein may be used to provide communications backhaul services for municipal systems like lighting, utilities or parking systems, for example. The gateway devices described herein may be used to track conditions inside shipping containers on board ships or track location and movements of workers at remote work sites, for example.

FIG. 1 is a block diagram of a remote backhaul system 100 according to some embodiments. The remote backhaul system 100 comprises an edge device array 115. The edge device array 115 comprises one or more edge devices 110. The edge device 110 may also be referred to as a node, an end-node, a node device or a sensor node. In the context of the present description, each edge device 110 is remotely located in a difficult to access position or area for conventional network connections. The edge device 110 is positioned at a distance from a gateway device 120 such that wireless communication between the edge device 110 and the gateway device 120 is feasible. In some embodiments, the farthest position of the edge device 110 from the gateway device 120 may be a distance of 10, 11, 12, 13, 14 or 15 km, for example.

Communication link 118 comprises wireless communication links between edge devices 110 and the gateway device 120. The wireless communication link 118 may be a communication link in the form of a LoRa™ wireless link or a Narrowband Internet of Things wireless link or Sigfox™ LPWAN wireless link or any other wireless communication link suitable for low power wide area network communication. Communication over the wireless communication link 118 may be made resilient to interference by utilizing spread spectrum techniques, such as Direct Sequence Spread Spectrum (DSSS) or Chirp Spread Spectrum (CSS), Random Phase Multiple Access (RPMA) and Listen-Before-Talk (LBT), for example.

The remote backhaul system 100 also comprises a satellite constellation 135. The satellite constellation 135 comprises one or more satellites 130. The satellite 130 is capable of communicating with gateway device 120 over a communication link 128. In embodiments with more than one satellite 130, the communication link 128 may extend to the more than one satellite 130. The communication link 128 may not be a persistent communication link and if satellite 130 is not accessible to the gateway device 120, the gateway device 120 may await the resumption of the radio communication link 128 to continue communication of information.

Radio Communication link 128 uses radio links to satellites 130 orbiting the earth to communicate data received at a gateway device 120 from the edge device array 115 and receive instructions or configuration information or firmware updates for edge device 110 or gateway device 120. The remote backhaul system 100 also comprises one or more ground stations 140. The ground stations 140 receive communication from one or more satellites 130 of the satellite constellation 135 over a communication link 138. The communication link 138 may be facilitated by radio waves of suitable frequency according to the region where the ground station 140 is located.

The satellite 130 may be a low earth orbit satellite that circles the earth approximately every 90-110 minutes, for example. With such orbiting satellites, a relatively smaller number of satellite ground stations 140 may be used to downlink or transmit all the data transmitted by gateway device 120.

In some embodiments, satellites 130 in a near polar orbit may be used and ground stations 140 may be located near each of the Earth's poles. This arrangement allows each satellite 130 to connect to a ground station 140 on almost every orbit, leaving the throughput latency no higher than 45 minutes (half the time required to complete an orbit), for example. In some embodiments, ground stations may be located at lower latitudes with less harsh weather and transport, and easier access to power and communication links to the ground station 140. The ground station 140 may comprise radio communication equipment necessary to communicate with the satellite 130 and a communication interface to relay received information to a core server 150 over a communications link 148. The communication link 148 may be a wired or wireless communication link to the internet available to the ground station 140 and to the core server 150. The core server 150 may be accessible over the internet through a client device 160 over a conventional internet connection over the communication link 158. The client device 160 may be an end user computing device such as a desktop, laptop, mobile device, tablet, for example.

The core server 150 may be configured to decrypt and/or decompress communication originating from a gateway device 120 and received over the communication links 128, 138 and 148.

The remote backhaul system 100 enables high-latency communication of data between the edge device array 115 and the client device 160. High-latency communication may be inherently suitable for transmitting small messages to and from the edge device array 115 deployed in remote locations and the client device 160. High-latency communication may comprise latency of greater than about 1 second or greater than about 2 seconds, for example. Two high-latency communication methods are store and forward communication and short burst data communication.

Store and forward communication may be implemented by the satellite constellation 135 that periodically passes into a range where communication may be received from a gateway device 120 positioned in a remote location. Satellite 130 may gather data from the gateway device 120 and deliver it back to ground stations 140 that are connected to a network backbone or a network generally accessible over the internet. In some embodiments, the store and forward communication could be implemented by satellites or any type of air, ground or sea vehicles (carrying suitable communication and storage equipment) that intermittently travel within communications range of the gateway device 120. The transfers of data by the store and forward method may be bi-directional. The vehicles or satellites used to implement store and forward communication can be far less numerous than the number of gateway devices 120 that would be needed to cover a designated remote area. Further, vehicles or satellites used to implement store and forward communication can be more rapidly deployed, which can save time during the implementation of the remote backhaul system 100, reduce the duration of blackouts resulting from failure of gateway devices 120 and permit maintenance operations and system upgrades to be carried out using the core server 150 rather than on site in the field.

Short Burst Data (SBD) is another technique for communicating short data messages between edge device 110 and a centralized host computing system such as the core server 150. SBD satellite messaging systems work by waiting for a suitable slot in a satellite network that has voice as its primary application. Examples include Iridium™ and Globalstar™. The voice traffic in such systems is prioritized and requires latencies typically less than 500 ms, for example. However, due to the fluctuating demands for voice traffic, there are windows in which shorter messages can be sent. This is analogous to the Short Messaging System (SMS) technique/standard used in terrestrial communications networks design for mobile telephony. The typical latencies of the SBD traffic in such systems can be in the range of 5 seconds to 10 minutes or greater, for example.

In some embodiments, the gateway device 120 comprises LPWAN antennas 312, 322 that are configured to communicate over 8 or 16 radio channels. The gateway device 120 may communicate with edge devices 110 within a range of 15 km, for example. The LPWAN antenna 312, 322 may be configured to communicate using the LoRa™ technology over the frequency bands 902-928 MHz, 863-870 MHz, 433-434 MHz, for example. The gateway device 120 may also be configured to communicate over Bluetooth (or other short-range) technology or over WiFi™ with devices located in its immediate vicinity, for example within a range of 15 m. The gateway device 120 may be configured to communicate with a maximum number of edge devices, such as at most 500 or 1000 edge devices, for example.

The gateway device 120 comprises a processor 340, which may be or comprise a Quad-Core ARM Cortex A53 operating at a speed of 1.2 GHz or 1.5 GHz, for example. The processor 340 in some embodiments may be implemented using an i.MX 8 based microcontroller. The processor 340 in some embodiments may be implemented using a Broadcom™ BCM2835 system on chip (SoC). The gateway device 120 may comprise 1 GB of LPDDR2 or 2 GB of LPDDR4 memory, and 4 GB, 16 GB or 64 GB of non-volatile memory, for example. The gateway device 120 may implement the ARM Secure Boot and TPM 1.2 security features, for example. The gateway device 120 may have any one or more of: a receive sensitivity of −140 dBm, output power of 24 dBm, input voltage of 9 to 12 Volts, and a battery 374 with the capacity of 11.1 V 3S LiPo 4500 mAh, for example. In some embodiments, the battery 374 may be implemented using a deep cycle AGM battery with a voltage of 12V and a capacity of 4500 mAh, for example. The gateway device 120 may have an operating temperature of −40° C. to 70° C., for example. The gateway device 120 may have an IP rating IP67, and may support regions AU 915-928, US 902-928, AS 923, EU 863-870, IN 865-867. The gateway device 120 may support node classes A, C; support node activations OTAA, ABP; and/or support message types Confirmed Uplink, Confirmed Downlink, Un-Confirmed Uplink, Un-Confirmed, for example.

Figure 2:
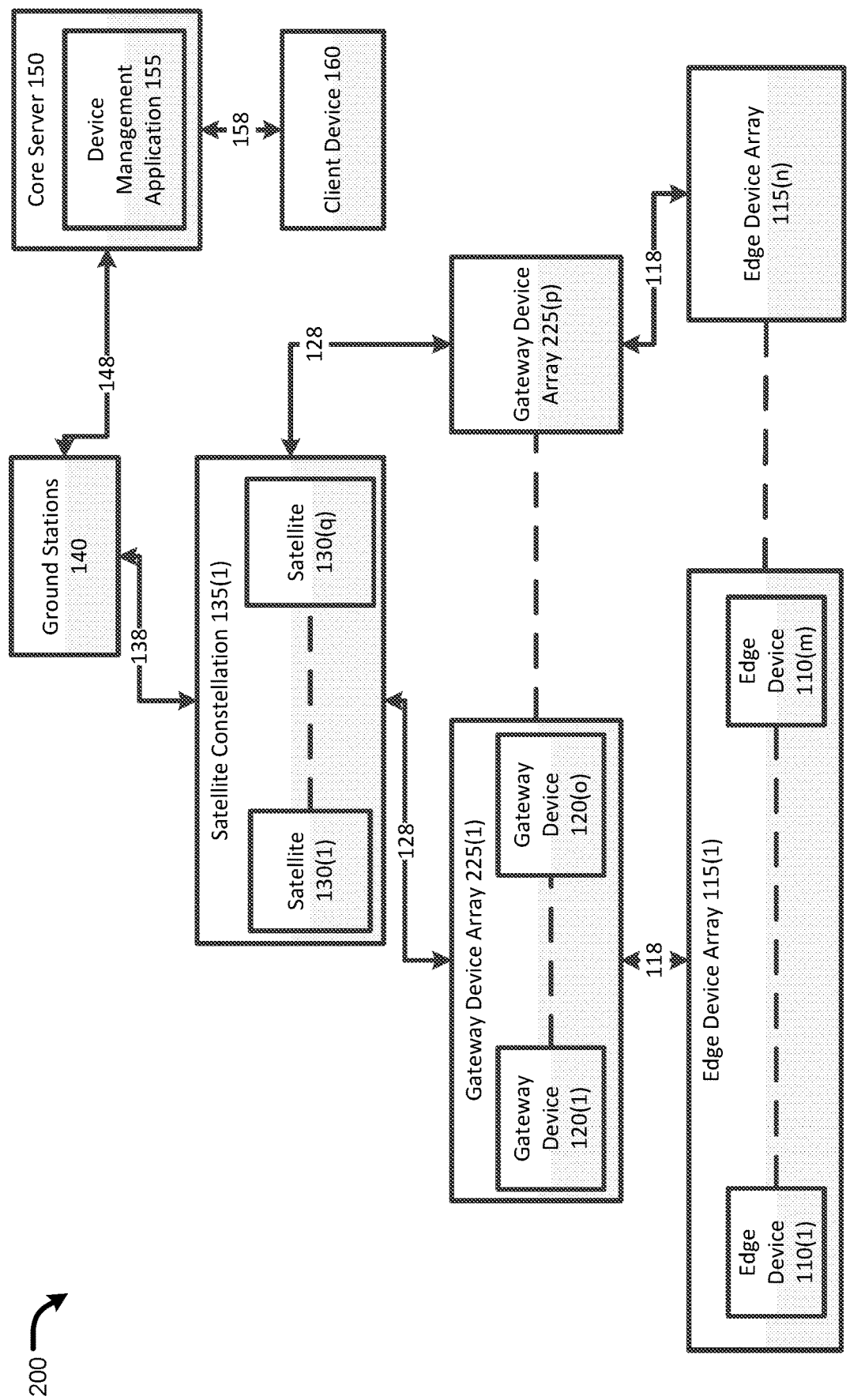
FIG. 2 is a block diagram of another remote backhaul system according to some embodiments.

FIG. 2 is a block diagram of a remote backhaul system 200 according to some embodiments. The remote backhaul system 200 comprises multiple edge device arrays 115. Each edge device array 115 may be located at a specific remote site or remote geographic area. Each edge device 110 of the edge device array 115 may connect to one gateway device 120, which may be a part of a gateway device array 225. The gateway device array 225 is a set of proximally (adjacently) located gateway devices 120 that allow the extension of the coverage area of the gateway device array 225 over one or more continuous regions or land areas. This allows the horizontal scaling of a large number of edge devices 110 that may form part of the remote backhaul system 200. For example, if a gateway device 120 has a range of 15 km, two gateway devices may be positioned at a distance of 30 km from each other to cover an area stretching up to a maximum of 60 km. In some embodiments, several gateway devices 120 forming the gateway device array 225 may have overlapping coverage zones or regions to form a continuous region or area of communication with the edge device array 115.

Each gateway device 120 of each gateway device arrays 225 of the remote backhaul system 200 is configured to communicate with the satellite constellation 135 over the radio communication link 128. The radio communication link 128 may not be a persistent link and it may be active intermittently. When the radio communication link 128 is inactive, each gateway device 120 may store the data received by the edge devices 110 that form part of the edge device array 115 and awaits the availability of the radio communication link 128 to commence transmission of stored data.

Figure 3:
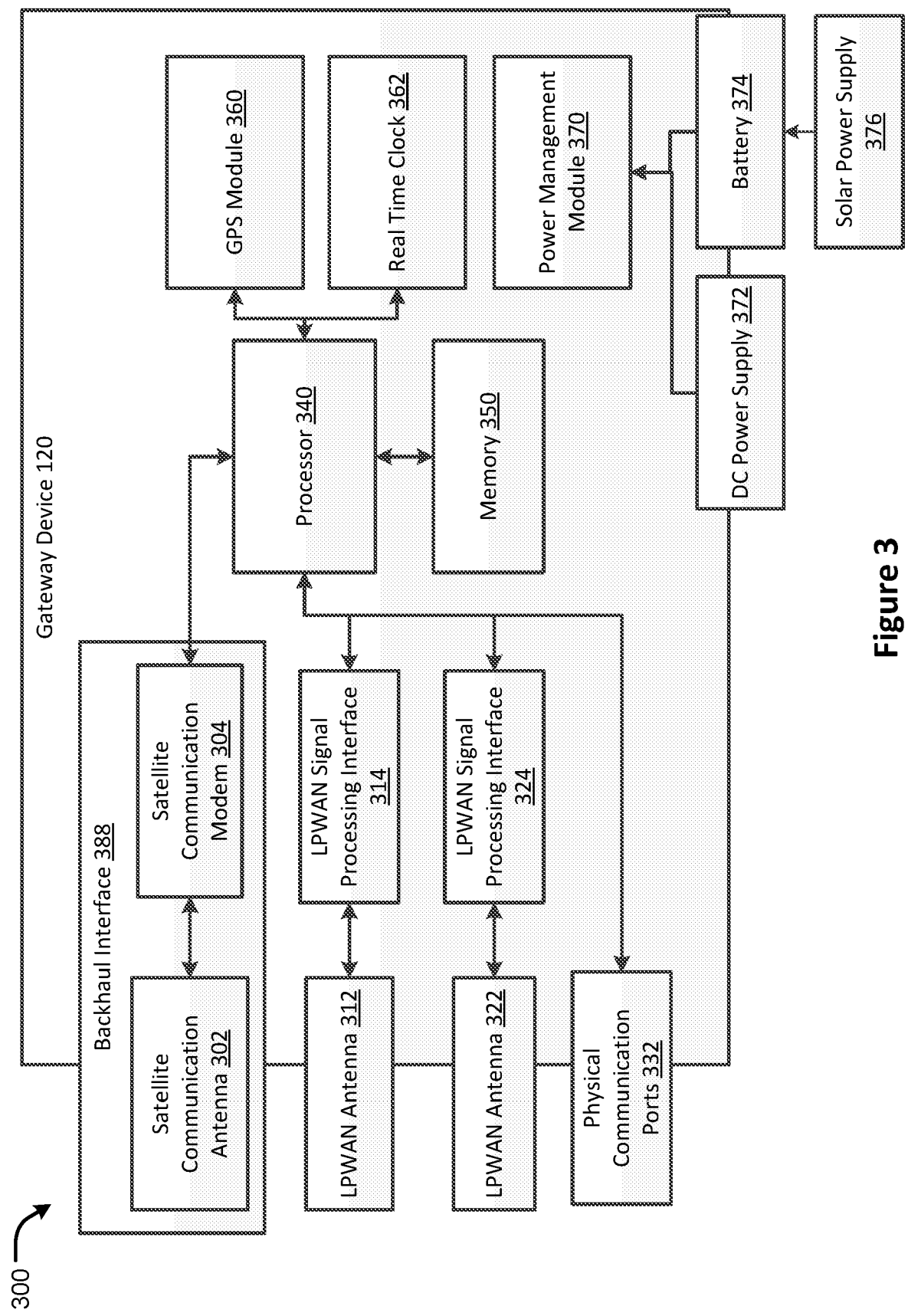
FIG. 3 is a block diagram showing example physical components of a gateway device.

FIG. 3 is a block diagram 300 showing some of the physical components of the gateway device 120 according to some embodiments. Gateway device 120 comprises a backhaul interface 388 that comprises a satellite communication antenna 302 and a satellite communication modem 304. The gateway device 120 comprises a main processor 340. The satellite communication antenna 302 is capable of bidirectional communication, including transmission and reception of signals from any one of the satellites 130 from the satellite constellation 135. The satellite communication modem 304 modulates signals transmitted by the satellite communication antenna 302 and demodulates signals received by the satellite communication antenna 302. Depending on the nature of the satellite 130, the satellite communication antenna 302 and the satellite communication modem 304 are accordingly configured to be able to communicate in the particular frequency range suitable for the satellite. Further, the nature of the satellite 130 also dictates the specific modulation and demodulation protocols applied by the satellite communication modem 304. The satellite communication antenna 302 is preferably an omnidirectional antenna which is more resistant than a directional antenna to physical misalignment due to wind, or other impact from humans or livestock, for example. However, in some embodiments, a directional antenna or multiple directional antennae may form part of the satellite communication modem 304 of the gateway device 120.

In some embodiments, the satellite constellation 135 may be an Iridium™ satellite constellation, and each of the satellites 130 will be a part of the Iridium™ satellite constellation. In some embodiments, the satellite constellation 135 may be a Globalstar™ satellite constellation, and each of the satellites 130 will be a part of the Globalstar™ satellite constellation. In some embodiments, the satellite constellation 135 may be a proprietary satellite constellation deployed specifically for providing services to one or more gateway devices 120.

Figure 24:
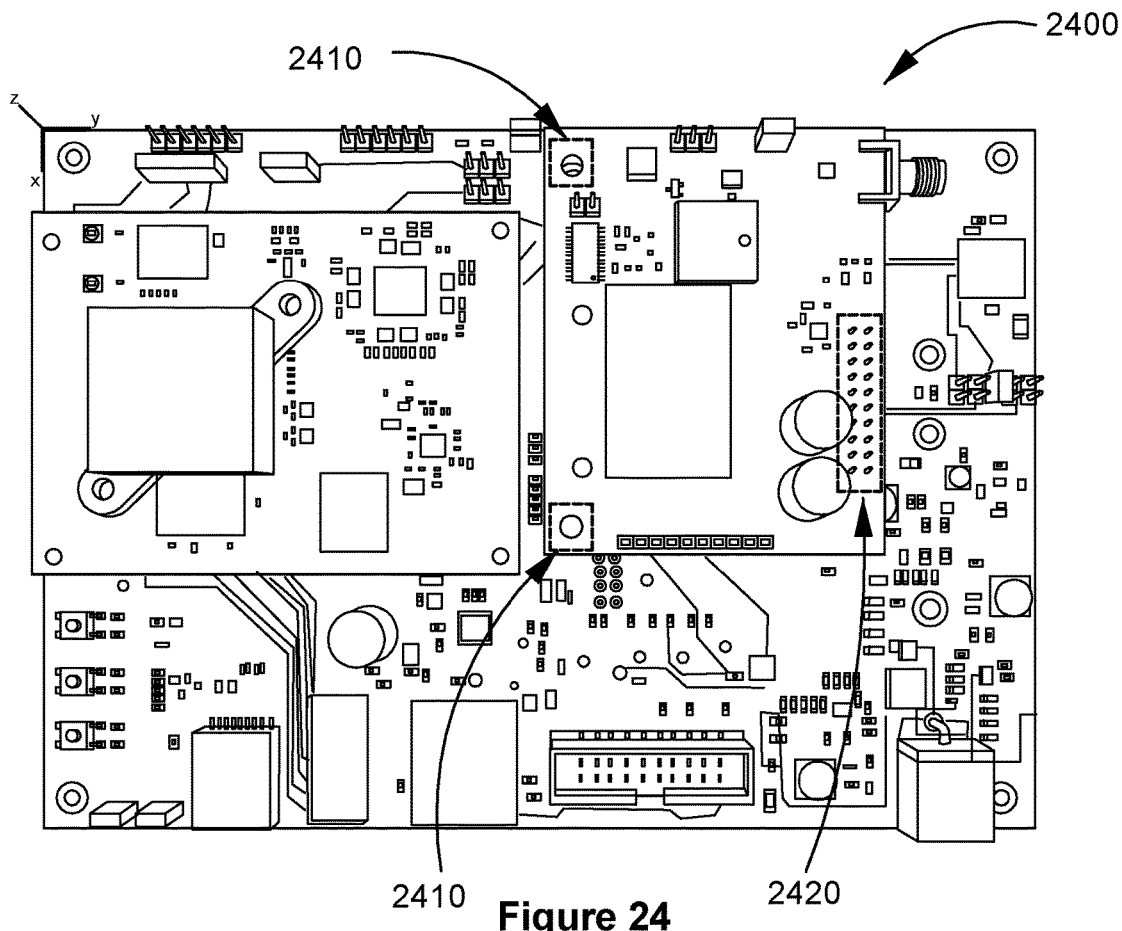
FIG. 24 is a plan view of an example printed circuit board (PCB) of the gateway device showing modularised connection interfaces for coupling modem units to the PCB.

In some embodiments, the gateway device 120 is capable of communicating with more than one satellite constellation 135, with each satellite constellation 135 implemented by a distinct set of satellites 130. In embodiments where the gateway device 120 is capable of communicating with more than one satellite constellation 135, the backhaul interface 388 of the gateway device 120 is accordingly configured to communicate with the more than one satellite constellation 135. The satellite communication antenna 302 may comprise multiple antennae to enable communication with each satellite constellation 135. Each satellite communication antenna 302 may have its own dedicated satellite communications modem 304 to modulate and demodulate signals received from and transmitted to each satellite constellation 135. Each satellite communication modem 304 may have an identical electronics interface with the processor 340 to enable modularity in integration with more than one satellite constellation 135. The identical electronics interface with the processor 340 also enables replacement or an update of the satellite communications modem 304 without the need to significantly change the rest of the components of the gateway device 120. For example, as shown in FIG. 24, the PCB structure of the gateway device 120 allows for modular connection of multiple different types of satellite modems to processor 340.

The gateway device 120 comprises one or more LPWAN antennae 312, 322. Each LPWAN antenna 312, 322 is configured to communicate with a respective LPWAN signal processing interface 314, 324. The LPWAN signal processing interfaces 314, 324 may be implemented using a specifically configured or programmed microcontroller, or a computer processor implemented on an IC, for example. The LPWAN antenna 312 enables bidirectional communication with one or more edge devices 110. The LPWAN antenna 322 is configured to communicate at a frequency dedicated to LPWAN communication in the territory in which the gateway device 120 is deployed. For example if the LPWAN communication is facilitated over the LoRa™ technology, then in Australia the LPWAN Antenna 322 is configured to communicate over the frequency band of 915-928 MHz. In some embodiments, the LPWAN antenna 322 may incorporate a concentrator board to enable communication with a greater number of edge devices 110.

The LPWAN Signal Processing interfaces 314, 324 and the Satellite Communication Modem 304 are connected to the processor 340, which is configured to receive processed signals from the LPWAN Signal Processing interfaces 314, 324 and the Satellite Communication Modem 304. The processor 340 is also capable of transmitting instructions to the LPWAN Signal Processing interfaces 314, 324 and the Satellite Communication Modem 304 to communicate data to edge devices 110 and satellites 130 respectively.

The processor 340 is also capable of accessing memory 350. Although processor 340 is mentioned herein in the singular, it may in fact comprise multiple processors or processing units. Thus, processor 340 should be understood to include multiple processors working together to perform the functions of processor 340 describe herein. Memory 350 may comprise a combination of volatile and non-volatile memory to store program code or instructions to implement server functions. The memory 350 may also temporarily store data received from edge device 110 or satellite 130. The memory 350 may also temporarily store (buffer) data to be transmitted to edge device 110 or satellite 130 through the LPWAN signal processing interfaces 314, 324 and the satellite communication modem 304.

In some embodiments, the gateway device 120 may comprise only one LPWAN antenna 312 and one LPWAN signal processing interface 314. In some embodiments, the gateway device 120 may comprise more than two LPWAN antenna 312, 322 and LPWAN signal processing interfaces 314, 324. An operating system (OS) such as Linux may be implemented on the gateway device 120 to provide a framework for the rest of the software running on the gateway device. The operating system may be stripped down to its essential components or libraries to minimise the memory or power consumption by the operating system alone. If a Linux OS is used, it may be based on Linux builds, such as Buildroot or Yocto, suitable for IoT type devices.

The operating system of the gateway device 120 is stripped or cut down in two ways. The first way is stripping out generic OS features from the OS kernel that are not needed for the kind of processor 340 and peripherals used by the gateway device 120. The second way is to only include a minimum set of application packages to interact with the OS (or the OS kernel) as compared to those application packages associated with a normal OS build for remote servers for IoT communications.

Some of the OS components that are stripped out in some embodiments include: hardware drivers for physical components not included in gateway device 120, any packages relating to graphical user interfaces, any printing relating services, any file indexing services and mail server components, for example. The operating system of the gateway device 120 is specifically built for the particular hardware components used in the gateway device 120 to improve overall efficiency of the processor 340 of the gateway device and avoid or minimise processing overheads.

If Linux is used as one example operating system, then there are two levels of stripping down the Linux OS build. The first level is in Linux kernel. Since it is already known what kind of processor and peripherals are used in the gateway device 120, the open-source Linux kernel for this particular processor or board can be modified so that the kernel support for the specific CPU and device drivers is minimised. Further, most of the non-essential features (for a low-power remote gateway device such as gateway device 120), such as debugging, audio, video and networking features that are commonly enabled for a generic Linux kernel are removed. The second level of optimization relates to Linux packages for applications. For a pared-down Linux build for gateway device 120, only bare minimum application packages required to support the software running on the gateway device 120 are retained, such as Python support and related libraries, TI WiLink firmware and WiFi management tools, Busybox utilities and a Linux software update support package, for example.

Gateway device 120 may also comprise a GPS (Global Positioning System) Module 360 accessible to the processor 340. The GPS module 360 performs the function of determining the terrestrial geographic location of the gateway device 120. The determined location may be transmitted to the satellite 130 to enable identification and tracking of the gateway device 120.

Gateway Device 120 also comprises a real time clock 362 that provides clock information to the processor 340. The clock information may be used for including time stamp information in data being transmitted to edge devices 110 or satellite 130. Time stamp information comprises current date and time information in the time zone of the gateway device 120. The time information may include time information in hours, seconds, milliseconds, for example.

Gateway device 120 also comprises a power management module 370. The power management module 370 manages the distribution of power to the various hardware components of the gateway device 120, according to the specific power requirements of the various components. A battery 374 may be provided in the gateway device 120 to provide power in case of a disruption in DC power supply 372 driven through a mains power source. Some embodiments may not be provided with a DC Power Supply 372 because of the remote location of the gateway device 120. Such embodiments may be provided with an alternative local energy harvesting power source, such as a solar cell array feeding a solar power supply 376 connected to the battery 374, for example.

Typical power consumption of the gateway device 120 depends on the number of edge devices 110 within its range and the type of satellite communication link 128. For example, for a gateway device 120 with around 50 edge devices 110 within its range and a communication rate of roughly 3 kb/day over the communication link 128, the power consumption of the gateway device 120 would be of the order of 15 W per day. As another example, for a gateway device 120 with around 100 edge devices 110 within its range and communication rate of roughly 6 kb/day over the communication link 128, the power consumption of the gateway device 120 would be of the order of 25 W per day. Alternative sources of energy, such as wind, hydroelectric or geothermal energy where available may be configured to power the gateway device 120 in combination with battery 374 or mains power sources. For a gateway device 120 connected to over 100 edge devices 110 or with higher backhaul data rates (10 kb/day), the power consumption would be 25 W per day or greater.

Figure 4:
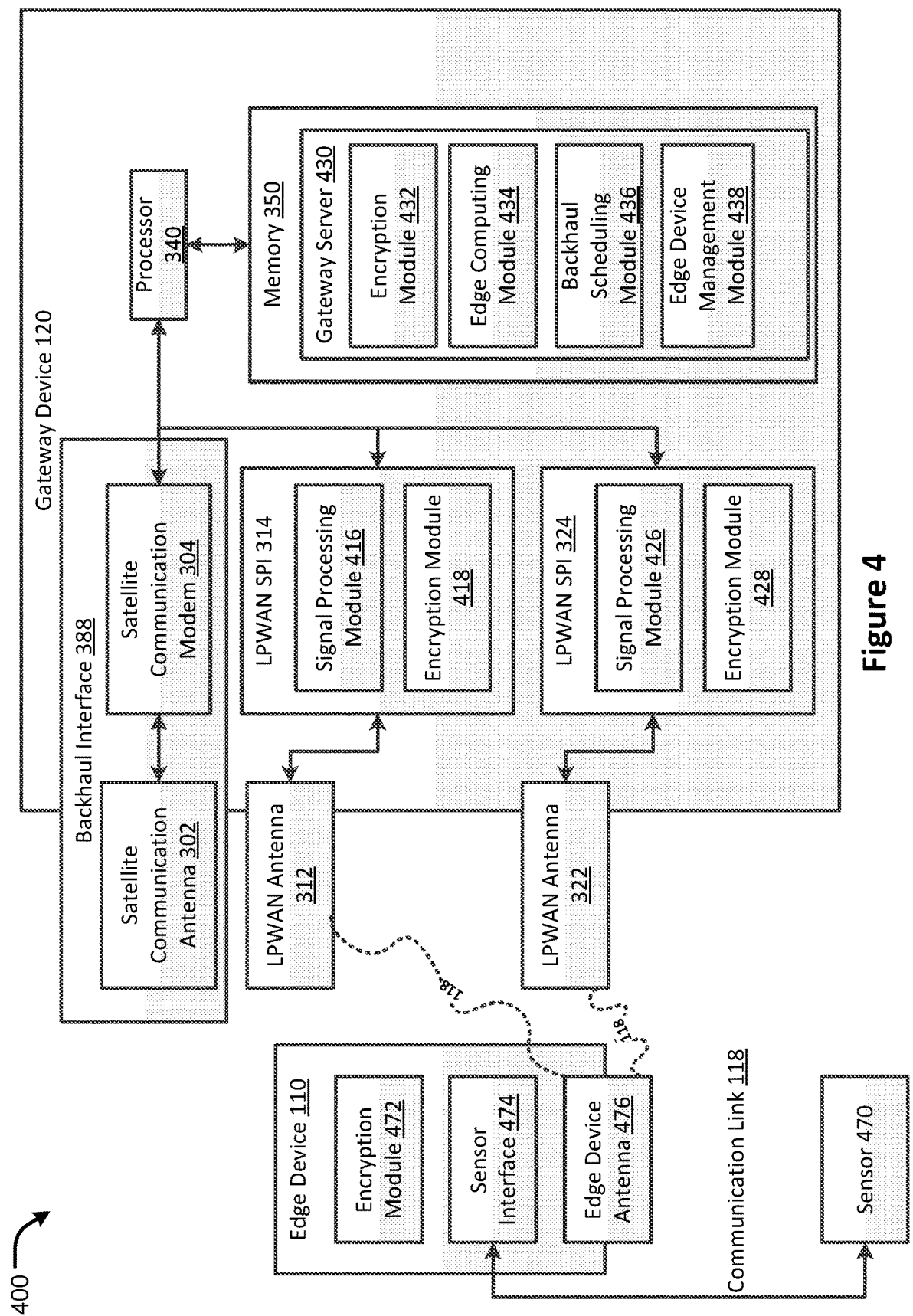
FIG. 4 is a block diagram showing some logical components of the gateway device and an edge device according to some embodiments.

FIG. 4 is a block diagram of an edge computing system 400 showing some of the logical components of a Gateway Device 120 implemented using the physical components shown in FIG. 3 in communication with an edge device 110. The LPWAN Signal Processing Interfaces 314, 324 comprise signal processing modules 416, 426 and encryption modules 418, 428. The signal processing modules 416, 426 perform the function of encoding and decoding radio frequency waveforms for communication with edge device 110 through the LPWAN antennas 312, 322 and an edge device antenna 476. The LPWAN antennas 312, 322 and the edge device antenna 476 are capable of both transmitting and receiving radio waves. The LPWAN antennas 312, 322 and the edge device antenna 476 may be omnidirectional antennas. Depending on the nature of LPWAN communication implemented by the gateway device 120, suitable LPWAN antennas 312, 322, edge device antenna 476, and LPWAN signal processing interfaces 314, 324 may be chosen. The encryption modules 418 and 428 encrypt information transmitted to edge device 110 and decrypts signals received from edge device 110. In some embodiments encryption may be based on an Advanced Encryption Standard using a key size of 128 bits.

A gateway server 430 may be implemented by the gateway device 120. The gateway server 430 is a software gateway server providing server functions while deployed in a remote environment as part of the remote backhaul system 100. The gateway server 430 comprises several software modules that provide specific functionality according to the needs of the remote backhaul system 100.

Encryption module 432 implements and manages encryption of communication through the gateway device 120. In particular, the encryption module 432 implements encryption over the communication link 128 through a public-key cryptographs approach such elliptic-curve cryptography (ECC) using a public key, for example. Encryption may be implemented at various levels of open system interconnection model, including encryption at the application, network or data link layer, for example. The encryption module 432 also performs the function of decrypting data or communication received from the satellite constellation 135 over the communication link 128.

In some embodiments, a default (static) network key is used by edge devices 110 to encrypt data packets being transmitted from each edge device 110. By using a default network key that is a static network key, it is possible to save on power, reduce the size of the packet payload or reduce the processing overhead for both the edge device 110 and gateway device 120. For example, battery power and processing power requirements on the edge devices is reduced.

In some embodiments, a device management application 155 may execute on the core server 150. The device management application 155 may be accessible by the client device 160 over the communication link 158. The device management application 155 may allow an authorised user to view and manage device configuration data in relation to one or more gateway device 120 and one or more edge device 110. The device management application 155 may allow an authorised user to register or de-register a new edge device 110 with a gateway device 120. The device management application 155 may allow an authorised user to effect software or firmware updates on an edge device 110 or gateway device 120. The device management application 155 may allow an authorised user to manage configuration details of the communication links 118 and 128. Permissions to perform specific operations through the device management application 155 may be allocated to specific user roles such as the role of a customer or an administrator, for example. The administrator user role may allow the management of credentials relating to a customer role, and the granting of privileges to new customer accounts. The device management application 155 may allow the communication of credentials to a gateway device 120 to facilitate the activation or registration of a new edge device 110 and generation session keys to encrypt communications originating from the edge device 110. In some embodiments, session keys to encrypt communications originating from the edge device 110 may be pre-configured on the gateway device 120 before deployment of the edge device. The device management application 155 may also provide administrators the ability to monitor network activity across the communication links 118 and 128.

An edge computing module 434 provides computing functionality as part of the gateway server 430. In effect, the edge computing module 434 enables distributed or decentralised computing that occurs at the gateway server 430 deployed in the field as part of the gateway device 120. The edge computing module 434 may implement pre-processing, compression, de-duplication, custom operations and other related operations on data received from edge device 110. These operations may enable a more efficient utilization of the communication link 128 to the satellite constellation 135. The edge computing module 434 allows the delegation or distribution of custom operations or data pre-processing operations to the gateway device 120 as opposed to the performance of the same custom operations or data pre-processing operations on the core server 150. This distribution or delegation of custom operations or data pre-processing operations facilitates a more efficient utilization of the limited and more expensive resource of the communication link 128 to a satellite 130. The custom operations or data pre-processing operations may be considered by a user accessing the device management application 155 through the client device 160. The custom operations or data pre-processing operations may include fault detection, compression, user defined analysis or any computation operation capable of being performed by the processor 340.

A backhaul scheduling module 436 manages the scheduling of communications over the communications link 128. In some embodiments, the communications link 128 may not be persistent and in order to avoid any data loss, the backhaul scheduling module may buffer data received edge device 110 and await the availability of the communications link 128 to initiate or continue communication. The backhaul scheduling module 436 may optimise the initiation and termination of communications through the backhaul interface 388 to further reduce power consumption of the gateway device 120.

An edge device management module 438 may manage the provisioning, identification, monitoring and decommissioning of each device part of the remote backhaul system 100. The edge device management module 438 implements preamble, header and cyclic redundancy checks at the MAC (media access control) layer in relation to data packets transmitted over the communication link 118. The edge device management module 438 also implements a media access control protocol over the physical communications layer. The edge device management module 438 assigns each edge device 110 a specific frequency, spreading code and data rate; schedules acknowledgements in response to data received from the edge device 110 and in the case of multi-gateway networks as illustrated in FIG. 2, facilitates de-duplication of received messages. In some embodiments, the acknowledgements in response to data received from the edge device 110 may be in near real-time, for example within 4 to 6 seconds.

The edge device management module 438 handles communication frames from and to the edge device 110, optimises the communication link 118 to each edge device 110, schedules transmission from and to each edge device 110, and manages and provisions new edge devices 110 as part of an edge device array 115. Provisioning a new edge device 110 may include checking a join request from the new edge device 110 and allowing only validly provisioned edge devices 110 to join the edge device array 115, and sending real-time acknowledgements of data received by the gateway device 120. Before provisioning, an edge device 110 is configured with a unique edge device identification and a key.

Upon provisioning of an edge device 110 located within the range of a gateway device 120, the edge device 110 initially transmits a request to initiate communication with the gateway device by transmitting its unique identifier and key. After receiving the unique identifier and key, the gateway device 120 confirms the validity of the unique identifier and key. The confirmation may be based on information received by the gateway device from the core server 160 or a pre-configuration of the gateway device 120. If the received unique identifier and key are determined to be valid by the gateway device 120, then communication of data sensed by the edge device 110 to the gateway device over the communication link 118 may commence.

The edge device management module 438 may also be configured to monitor radio frequency parameters such as signal to noise ratio (SNR) and received signal strength indicator (RSSI). The edge device management module 438 may manage adaptive data communication rates over the communication link 118 to minimise the on-air-time and power consumption by adjusting the data rate, radio frequency power and spreading factor, taking into account the measured SNR of recent communication received from edge devices 110. The edge device management module 438 may also select one of the available radio frequencies for the communication link 118 and may configure and optimise parameters that affect the relative timing of reception slots and transmission slots.

In some embodiments, the edge device management module 438 may implement a listen before talk behaviour over the communication link 118, wherein the gateway device 120 scans the background radio frequencies in the gateway operational spectral band for any communication from edge device 110 before sending any messages to an edge device 110. In some embodiments, the edge device management module 438 may transmit network wide broadcast messages to each edge device 110 in the edge device array 115 to consolidate or synchronise each edge device 110 within its range.

In some embodiments, the edge device management module 438 may authenticate each edge device 110 within its range and automatically generate symmetric keys for subsequent encryption of communication over the communication link 118. In some embodiments, the edge device management module 438 may periodically request the edge device 110 for their power and performance relates information, battery status, demodulation signal-to-noise ratio, for example. In some embodiments, the edge device management module 438 may provide debugging features. The debugging feature may include live frame logging allowing a user to inspect all raw and encrypted communication over the communication links 118 and 128 in real time.

Edge device 110 comprises its own encryption module 472 that may be implemented on a microcontroller or similar computing device to encrypt communications send to the gateway device 120 and decrypt communication received from the gateway device 120. The edge device 110 comprises the edge device antenna 476 through which the edge device 110 receives and transmits signals. Edge device 110 is configured to communicate with a sensor 470 over a communication link 118 through a sensor interface 474. The sensor may be any suitable sensor for the remote environment, such as a temperature sensor, sound sensor, moisture sensor, for example.

Figure 5:
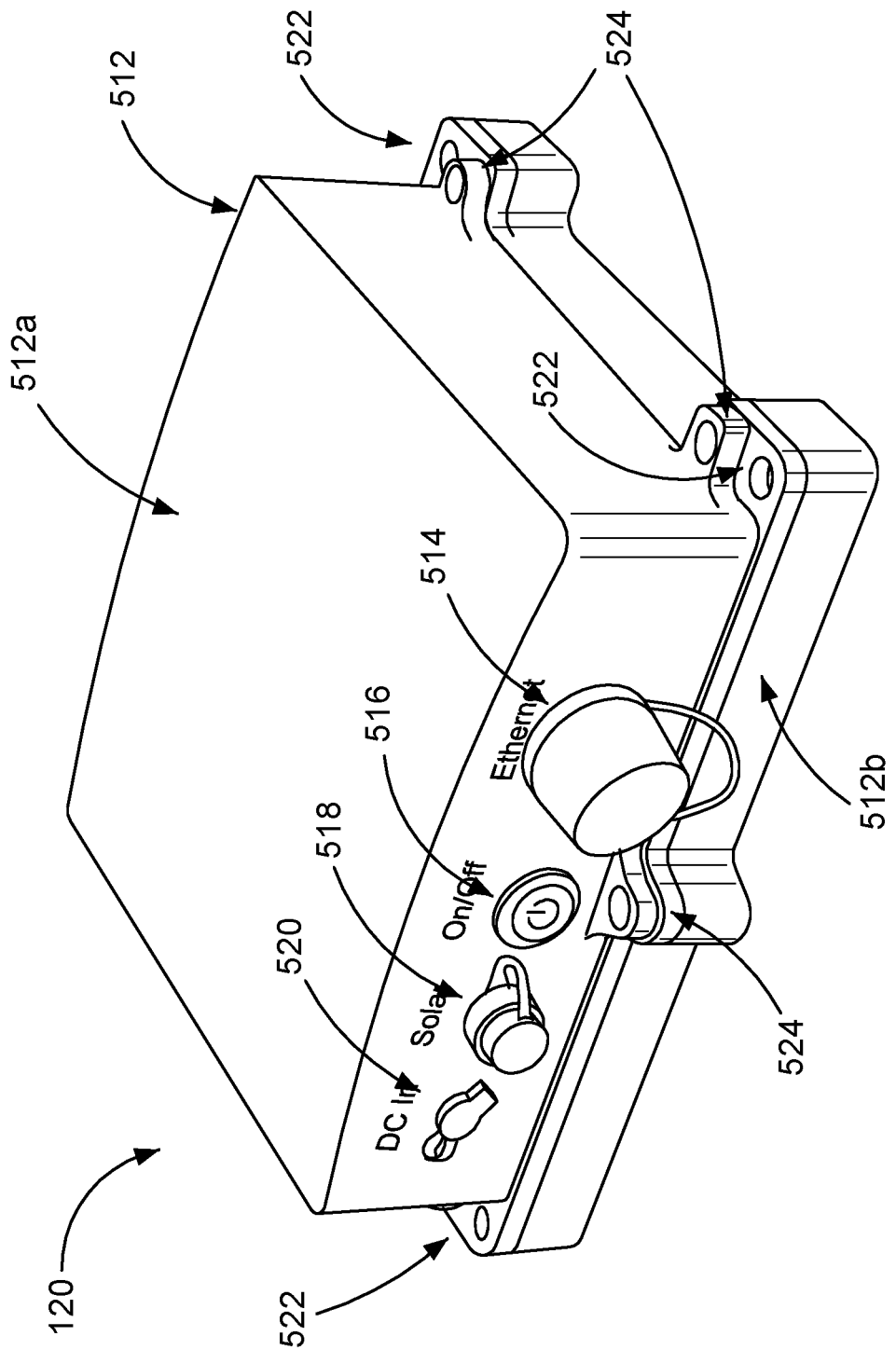
FIG. 5 is a perspective view of a housing of the gateway device according to some embodiments.

FIG. 5 is a perspective view of a gateway device 120 according to some embodiments. The gateway device 120 comprises a housing 512 that houses all of the components of the gateway device 120. The housing 512 is preferably formed of a solid moulded plastic material in two main parts (a top portion 512a and a base portion 512b) that are fastened together. The housing 512 may be a weather proof rugged housing with suitable sealing structures for use in remote environments. In some embodiments, the housing 512 may also be waterproof to allow use in environments when the risk of exposure to moisture is significant.

The gateway device 120 may comprise an Ethernet port 514 to allow configuration or maintenance of the gateway device 120. An on/off switch 516 allows the initiation or termination of the operation of the gateway device 120. A first power supply port 518 allows for the connection of a solar power source to the gateway device. A second power supply port 520 allows the connection of a DC power supply to the gateway device. The gateway device 120 may be mounted via the base portion 512b on a surface through mounting points 522, with the base portion 512b of the housing 512 being adjacent the mounting surface. The housing 512 may be configured with security screws at region 524 to deter unauthorised access to the internal components of the gateway device.

Figure 6:
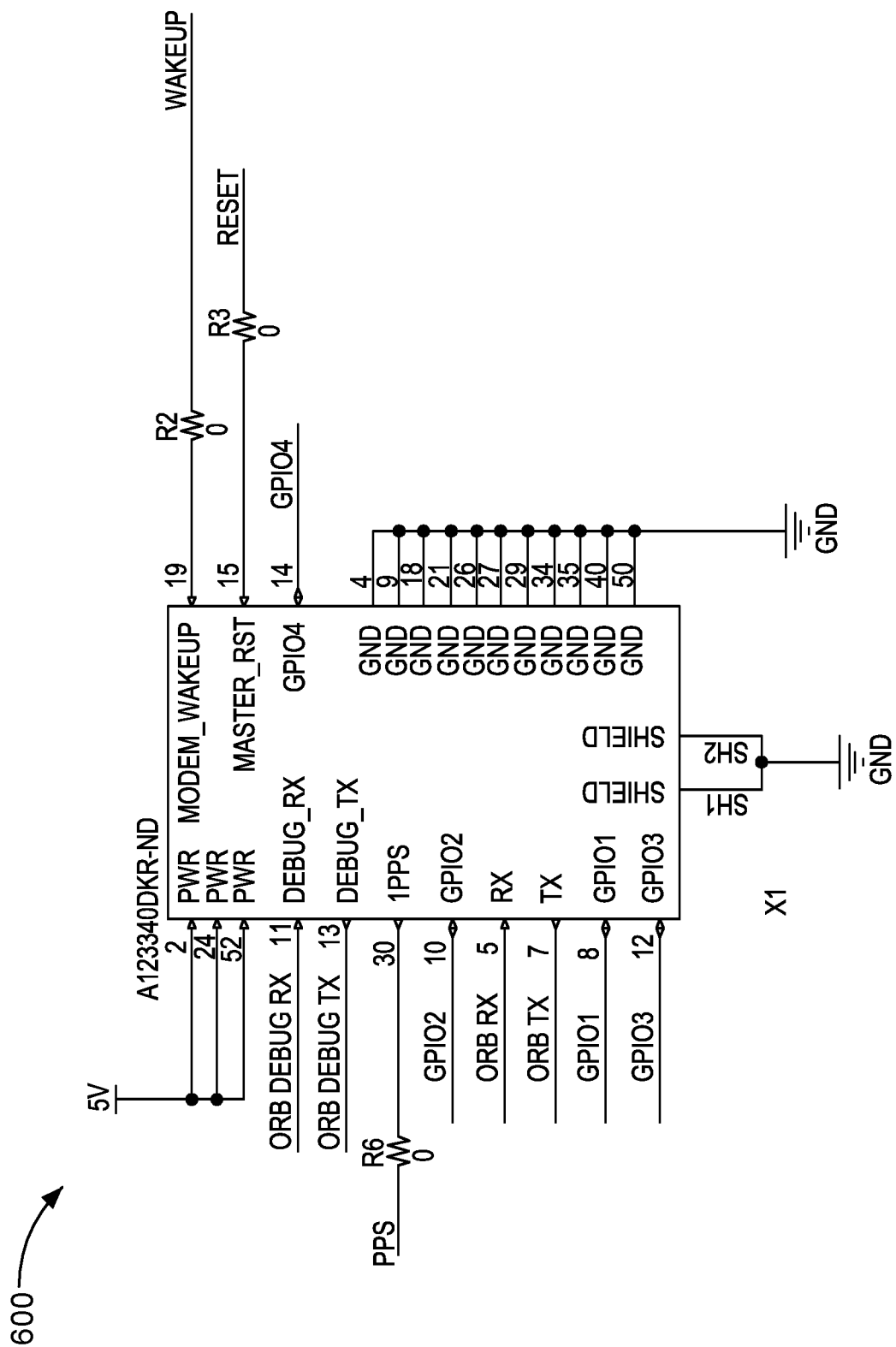
FIG. 6 is a schematic circuit diagram of part of a circuit of a satellite communication model.
Figure 8:
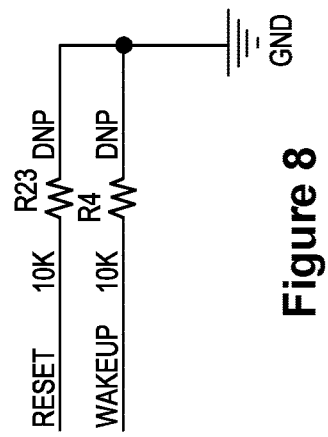
FIG. 8 is a schematic diagram of a pull-down circuit of the satellite communication modem.
Figure 10:
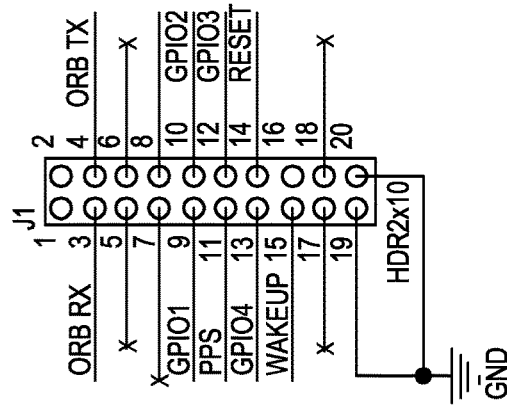
FIG. 10 is a circuit layout diagram of another connection block forming part of the satellite communication modem.
Figure 7:
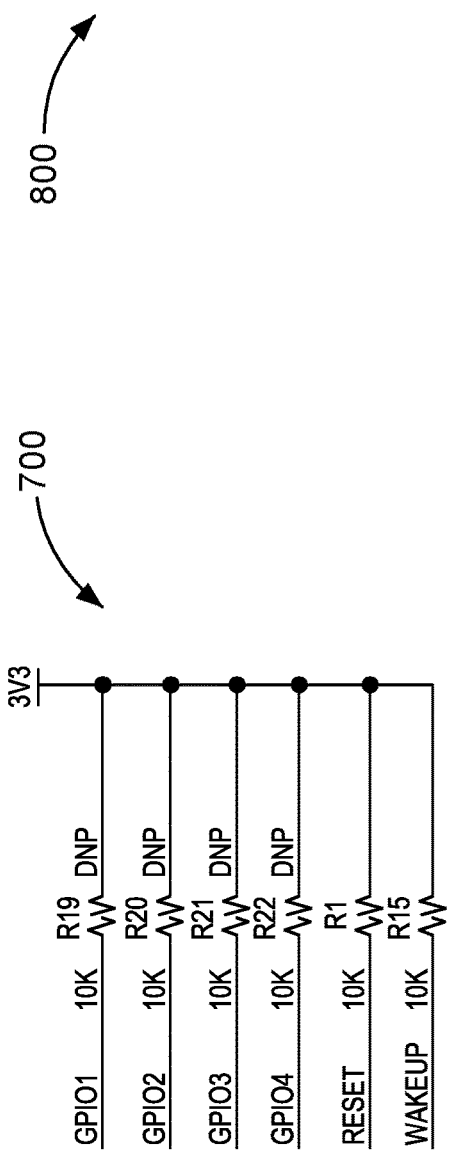
FIG. 7 is a schematic diagram of a part of a pull-up circuit of the satellite communication modem.
Figure 9:
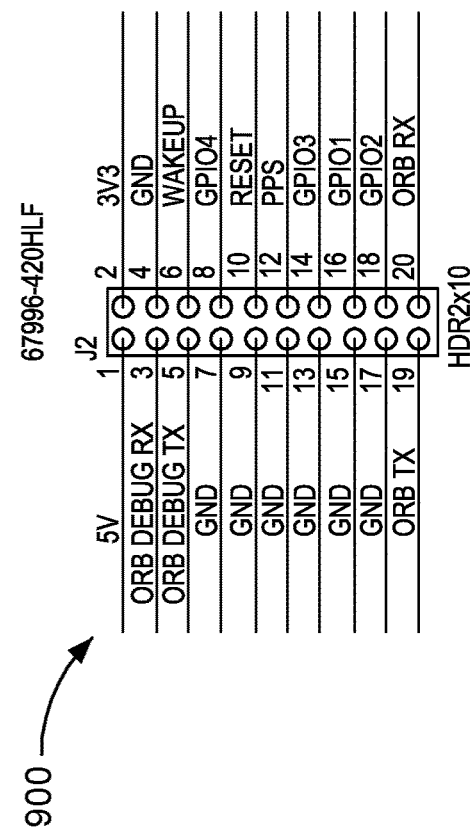
FIG. 9 is a circuit layout diagram of a connection block of the satellite communication modem.

FIG. 6 is a circuit layout diagram implementing a part 600 of the satellite communication modem 304, suitable for communication with an Orbcomm™ satellite communication service. FIG. 7 is a circuit layout diagram implementing a pull up circuit 700 for part of the satellite communication modem 304, suitable for communication with an Orbcomm™ satellite communication service. FIG. 8 is a circuit layout diagram implementing a pull down circuit 800 for part of the satellite communication modem 304, suitable for communication with an Orbcomm™ satellite communication service. FIG. 9 is a circuit layout diagram implementing a connection block 900 as part of the satellite communication modem 304, suitable for communication with an Orbcomm™ satellite communication service. FIG. 10 is a circuit layout diagram implementing a second connection block 1000 as part of the satellite communication modem 304, suitable for communication with an Orbcomm™ satellite communication service.

FIG. 11 is a circuit diagram implementing part 1100 of a power management circuit for the satellite communication modem 304, suitable for communication with an Orbcomm™ satellite communication service. FIG. 12 is a circuit diagram implementing part 1200 of a power management circuit for the satellite communication modem 304, suitable for communication with an Orbcomm™ satellite communication service. FIG. 13 is a circuit diagram implementing part 1300 of the power management circuit for the satellite communication modem 304, suitable for communication with an Orbcomm™ satellite communication service. FIG. 14 is a circuit diagram implementing part 1400 of the power management circuit as part of the satellite communication modem 304, suitable for communication with an Orbcomm™ satellite communication service. FIG. 15 is a circuit diagram implementing part 1500 of the power management circuit as part of the satellite communication modem 304, suitable for communication with an Orbcomm™ satellite communication service.

Figure 21:
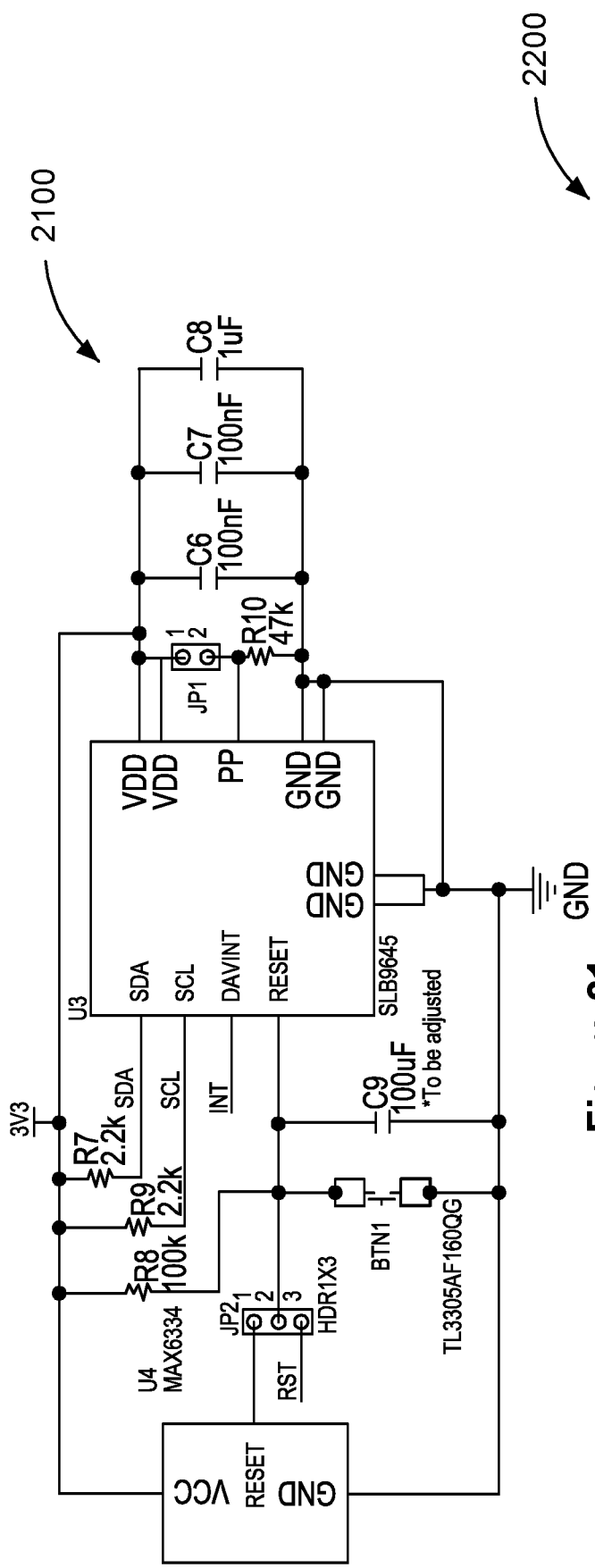
FIG. 21 is a circuit layout diagram of a hardware security circuit forming part of the satellite communication modem.
Figure 22:
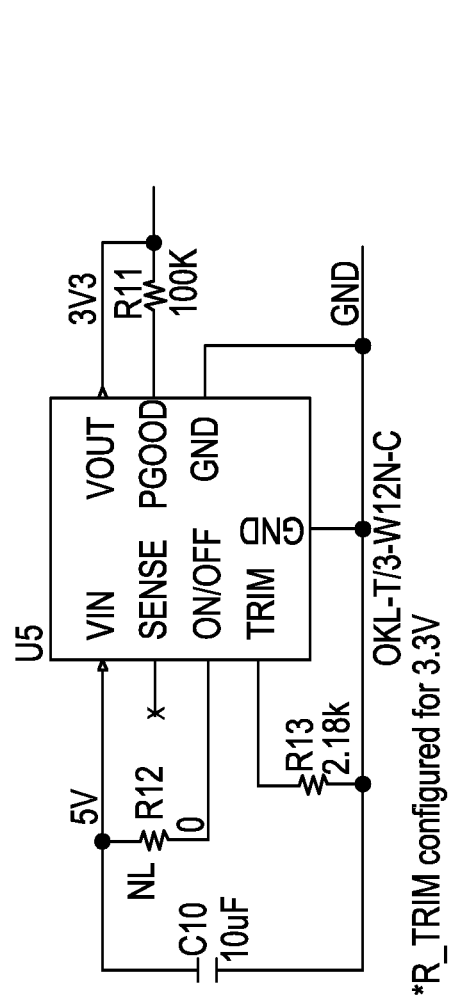
FIG. 22 is a circuit layout diagram of part of a power management circuit forming part of the satellite communication modem.

FIG. 16 is a circuit diagram illustrating part of a supercapacitor charger 1600 configured for use as part of the satellite communication modem 304 suitable for communication with an Iridium™ satellite communication service. FIG. 17 is a circuit diagram illustrating part of radio frequency connectors 1700 configured for use as part of the satellite communication modem 304 suitable for communication with an Iridium™ satellite communication service. FIG. 18 is a circuit diagram illustrating a short burst data only transceiver 1800 configured for use as part of the satellite communication modem 304 suitable for communication with an Iridium™ satellite communication service. FIG. 19 is a circuit diagram illustrating a header block 1900 configured for use as part of the satellite communication modem 304 suitable for communication with an Iridium™ satellite communication service. FIG. 20 is a circuit diagram illustrating another header block 2000 configured for use as part of the satellite communication modem 304 suitable for communication with an Iridium™ satellite communication service. FIG. 21 is a circuit diagram illustrating part of a hardware security chip 2100 configured for use as part of the satellite communication modem 304 suitable for communication with an Iridium™ satellite communication service. FIG. 22 is a circuit diagram illustrating part of a power management circuit 2200 configured for use as part of the satellite communication modem 304 suitable for communication with an Iridium™ satellite communication service.

Figure 23:
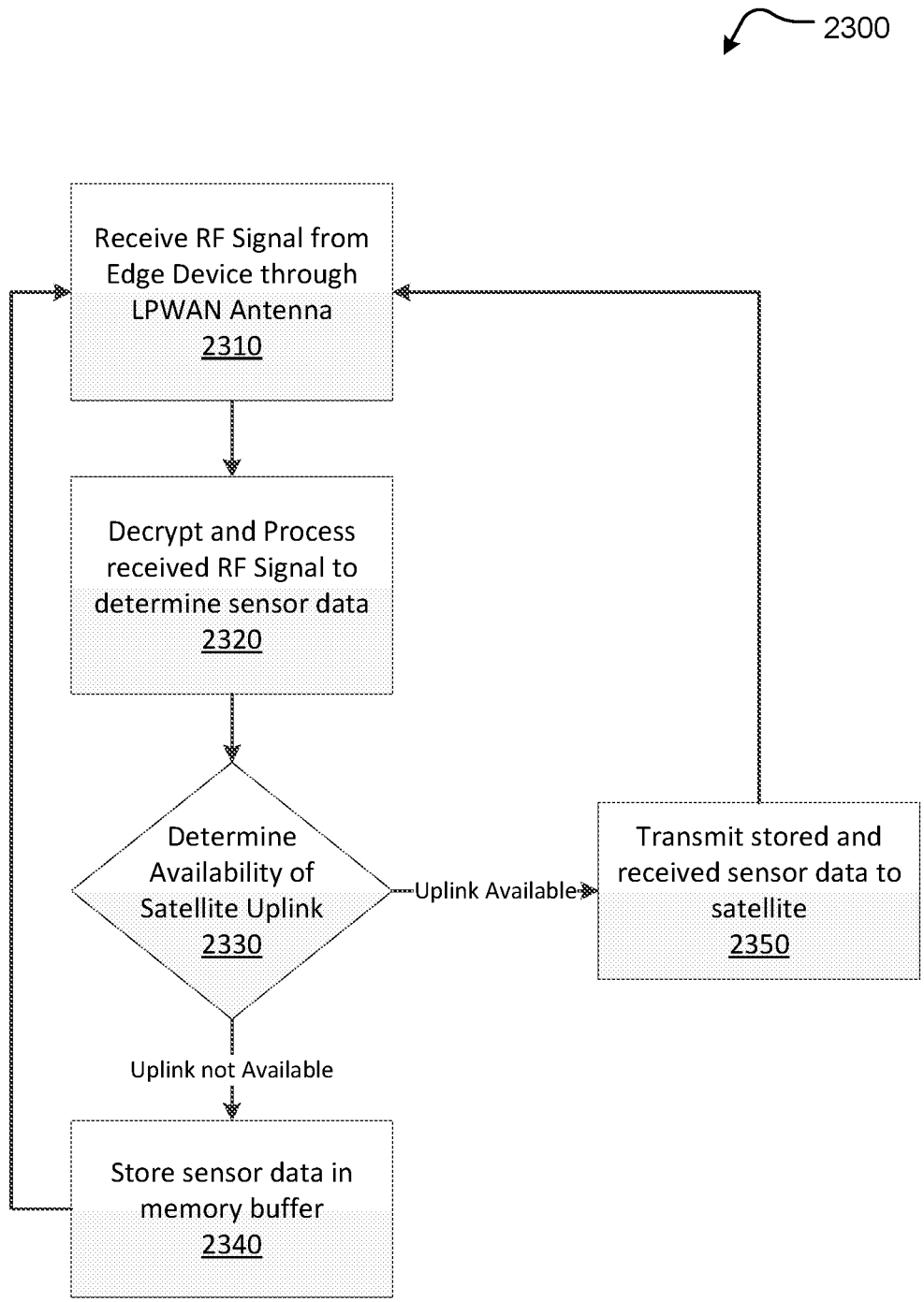
FIG. 23 is a flow chart of a series of steps performed by the gateway device.

FIG. 23 is a flowchart 2300 of a series of steps performed by the gateway device 120 to provide high-latency backhaul services. At step 2310, the gateway device 120 receives a radio frequency signal from an edge device 110 within the range of the gateway device 120. The signal comprises information determined or generated by the edge device 110, for example from a sensor 470. Before transmitting the signal, the edge device 110 may encrypt the data to secure the signal from unauthorised access. At step 2320, the received radio frequency signal is processed and, if necessary, decrypted by the LPWAN signal processing interface 314, 324 to determine the data encoded in the signal transmitted by the edge device. The processing may include repackaging of messages or data frames received from edge devices 110 to reduce the payload or data transmitted to the satellite 130. The process of repackaging may involve stripping of destination and source MAC headers, message integrity codes, message preamble, start frame delimiter, payload header, and cyclic redundancy checks, for example. The process of repackaging essentially extracts the message payload from the messages sent from an edge device 110 to minimise the volume (in bits per message) of communications to the satellite 130 over the communications link 128, which saves time (i.e. power consumption) and cost.

At step 2330, the gateway device 120 through its backhaul interface 388 determines if a satellite communication uplink is available to the gateway device. The determination of availability of the satellite communication uplink may occur based on a pre-determined schedule or an actual communications test with a satellite 130. If a satellite communications uplink is not available, at step 2340, the determined data is stored in the memory 350 of the gateway device. If a satellite communications uplink is available, at step 2350, the determined data along with any stored data in the memory 350 is transmitted to the satellite 130 through the satellite communications link 128.

The steps of flowchart 2300 may be implemented by multiple processing threads executing on the processor 340 of gateway device 120. Each thread may be independently executable in parallel with rest of the threads. Implementation of threading to provide backhaul services enables parallelisation of functions performed by the processor 340 of gateway device 120 while accommodating for substantial delays in communication or unavailability of certain communication links, such as the satellite communication link 128. The threads are implemented to help avoid data loss and maintain coherence of communications in the event of breakdowns in one or more communication links, such as communication links 128 and 118.

The edge device management module 438 and the backhaul scheduling module 436 as executed by processor 340 may together implement the one or more threads. For example, a satellite transmission thread may be implemented by gateway device 120 to transmit messages received by the gateway device 120 from one or more edge devices 110 to the satellite 130. A satellite reception thread may be implemented by the gateway device 120 to receive messages from the satellite 130 and transmit the received messages to one or more edge devices 110. An acknowledgements management thread may be implemented by the gateway device 120 to listen for acknowledgements in response to messages sent to a satellite 130 or an edge device 110. The communication of messages between the gateway device 120 and edge device 110 over the communication link 118 may be implemented using a suitable protocol, such as the MQTT protocol, for example. The multiple processing threads may be managed by a single supervisory or master thread which ensures that on the unexpected failure of a thread, it is restarted to appropriately to continue execution from where the failed thread had terminated execution.

Figure 25:
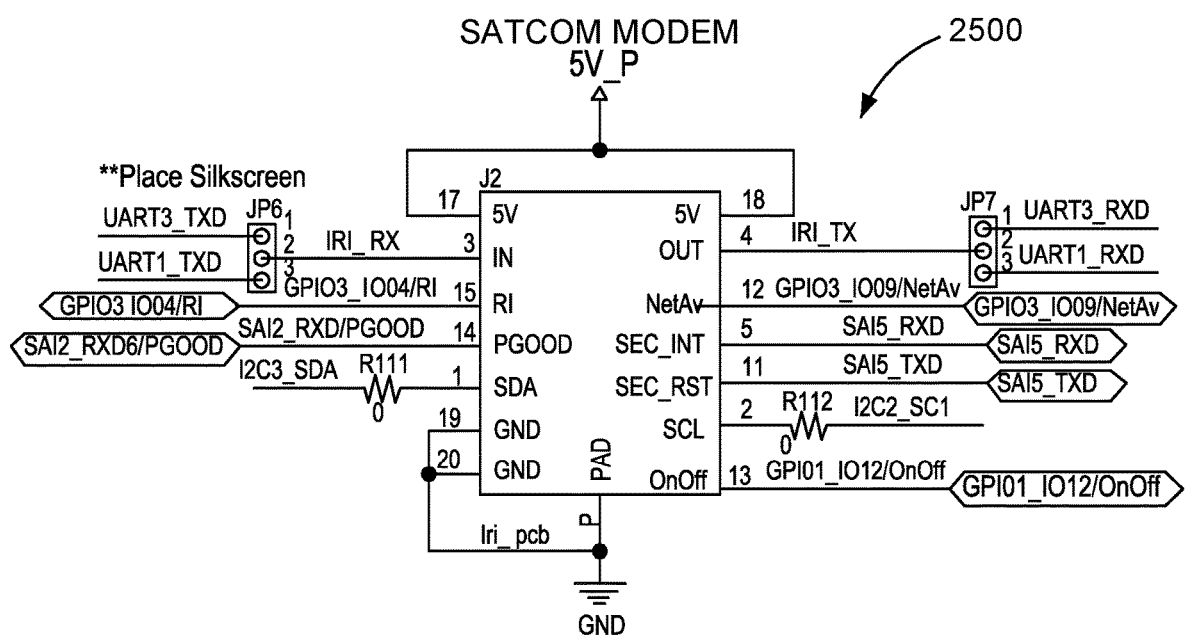
FIG. 25 is an example schematic circuit diagram of one kind of satellite modem usable with the gateway device.
Figure 26:
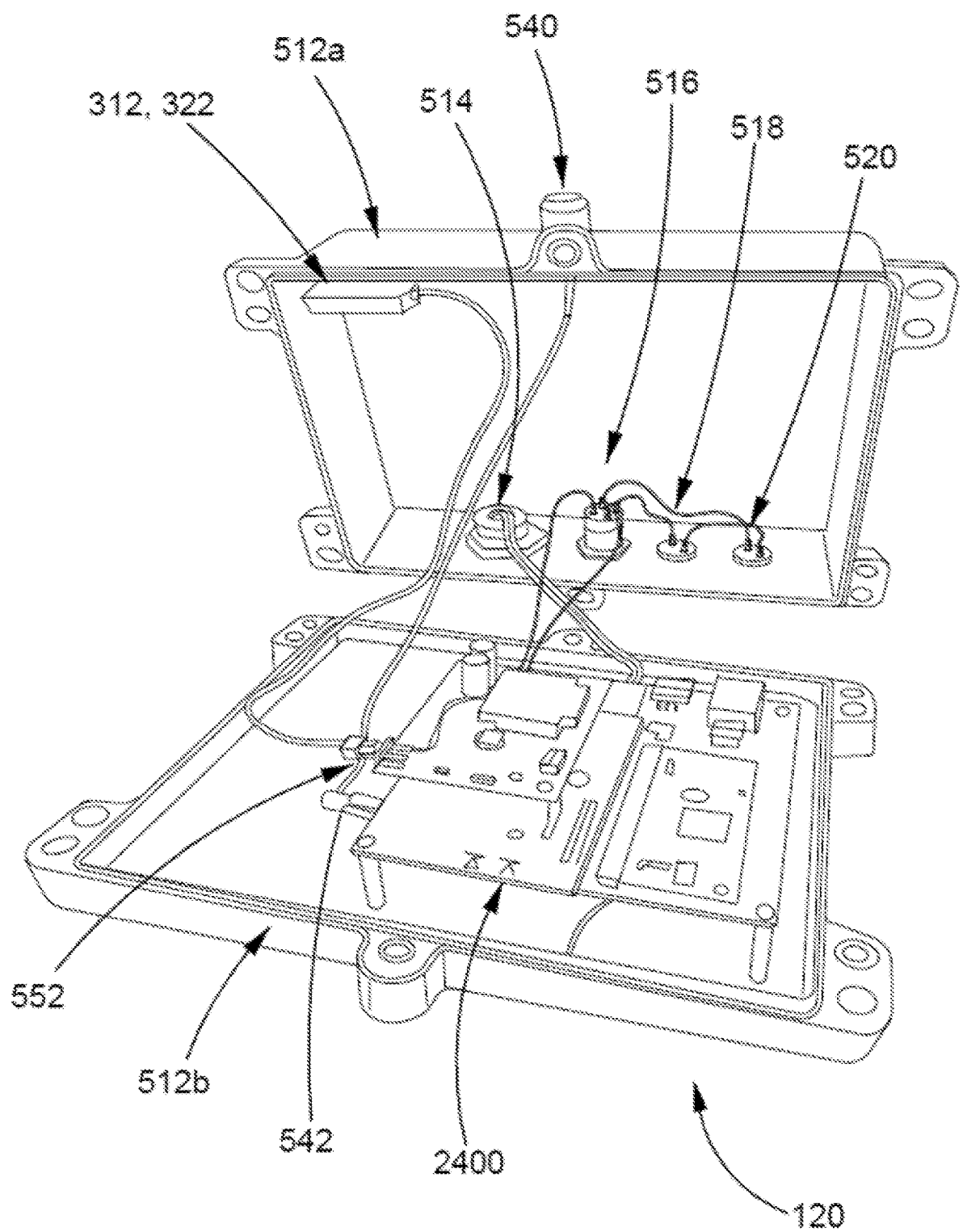
FIG. 26 is an image in perspective view of an example gateway device, showing a housing of the device in an open state to reveal electronic components and electrical wiring of the same.

FIG. 24 is an image of printed circuit board (PCB) substrates 2400 that carry the electronics of the gateway device 120. At least one of the PCB substrates 2400 has a modular connection arrangement to allow multiple different satellite modems to be connected as part of the backhaul interface 388 to communicate with the processor 340. For this modular arrangement, the PCB substrate 2400 has two screw holes 2410 for physical mounting of the modem and a pin header 2420 for electrical connection to the processor 340. FIG. 25 is an example schematic circuit diagram of a Satcom modem 2500 that can be connected to the PCB substrate 2400 as a satellite modem In addition to FIG. 5, an example of gateway device 120 is also shown in further detail in FIG. 26, with the housing 512 in an open state. As is visible in FIG. 26, the PCB substrates 2400 are disposed inside the housing 512, connected by spacer rods to the base portion 512b. A satellite antenna connection port 540 (providing mechanical and electrical connection) is disposed on a side of the top portion 512a that is opposite to the side on which the ports 514 (Ethernet), 518 (VDC), and 520 (Solar) are disposed. As can be seen in FIG. 26, electrical conductors extend inside the housing 512 from the ports 514, 518 and 520 to the PCB substrates 2400. An electrical conductor also extends inside the housing 512 from the on/off switch 516 to the PCB substrates 2400. A communication cable extends from the satellite antenna connection port 540 internal to the housing 512 to an antenna jack 542 connected to one of the PCB substrates 2400.

FIG. 26 also shows the one or more LPWAN antennae 312, 322 connected by a communication cable inside the housing 512 to an antenna jack 552 connected to a separate part of a PCB substrate 2600 from the satellite antenna jack 542. The satellite antenna connection 540 is positioned so that a satellite antenna, when it is connected to the connection port 540 and the housing 512 is mounted to a vertical wall, extends upward away from the housing 512, while the oppositely positioned ports 514, 518 and 520 are disposed at a lower edge of the housing to be readily accessible to a person standing near the wall.

Figure 27:
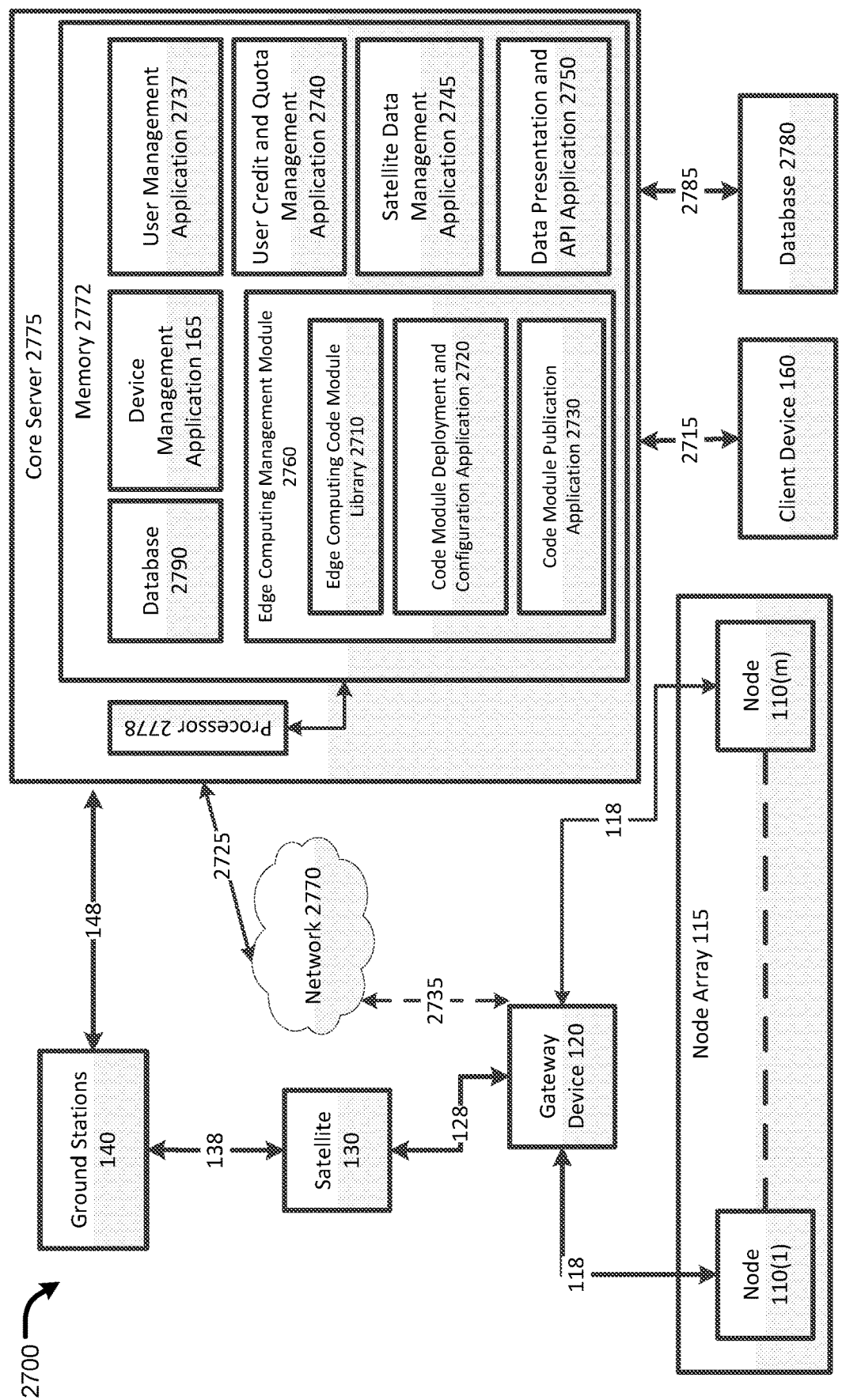
FIG. 27 is a block diagram of a remote backhaul system according to some embodiments.

FIG. 27 is a block diagram of a remote backhaul system 2700 according to some embodiments. The remote backhaul system 2700 comprises a core server 2775. The core server 2775 of the remote backhaul system 2700 comprises a processor 2778 and a memory 2772. In this context, the processor 2778 may comprise more than one processor or processing unit and more than one type of processor. The memory 2772 is accessible by the processor 2778. The memory 2772 is configured to store information and make the stored information available to the processor 2778. The core server 2775 may be implemented as a standalone physical server or a virtual server (distributed across multiple physical servers) implemented on cloud computing service, for example.

Several software code modules or applications are stored in the memory 2772, including: a device management application 165, an edge computing code module library 2710, a code module deployment and configuration application 2720, and a code module publication application 2730. The various modules and applications stored in memory 2772 of the core server 2775 enable the publication, management and distribution of code modules to each gateway device 120. In effect, core server 2775 serves at least in part as an application or code module store or repository or library for gateway device 120. The code modules or applications stored in memory 2772 include instructions executable by the processor 2778 to perform computational, communication or data processing functions, for example.

The edge computing code module library 2710 serves as a repository or store of multiple discrete edge computing code modules that may be executable by the gateway device 120. Each discrete edge computing code module comprises program code that implements an arithmetic, logical, statistical, scientific or other computational operation or a combination of two or more computational operations to perform data processing on the gateway device 120. The edge computing code modules may comprise Python program code capable of execution on the gateway device 120, for example.

The program code to implement edge computing code modules may be deployed on one or more gateway devices 120. In addition to storing program code defining the edge computing code modules, the code module library 2710 also keeps information regarding versioning details, relevant configuration parameters, compatibility requirements and execution scheduling configuration alternatives for each edge computing code module. Further, the code module library 2710 also stores information regarding interrelationships or dependencies between each discrete edge computing code module. For example, one interrelationship may be that the output of a first code module may be suitable as an input for a second code module.

In some embodiments, the code modules of the edge computing code module library 2710 may be implemented as functions with a defined set of inputs, a defined set of outputs and a specific operation to be performed on the inputs. For example, one edge computing code module may comprise a function to calculate moving averages of a sensor reading over a period of time. Another example is an edge computing code module that may filter sensor reading values and generate an alert if a sensor reading value exceeds a threshold. Several arithmetic, logical, statistical, scientific operations or a combination of operations may be implemented by the code modules stored in the code module library 2710 to enable edge computing operations to be performed on the gateway device 120.

The code module deployment and configuration application 2720 executing on the core server 2775 allows the deployment and configuration of edge computing code modules to gateway device 120. The edge computing code modules stored in the edge computing code module library 2710 may be specifically configured for a particular application before being deployed to a gateway device 120. For example, an edge computing code module for determining moving averages is configured with the duration over which the moving average calculation needs to be performed.

As another example, an edge computing code module may provide geo-fencing capability. The geo-fencing code module will include one or more configuration parameters to define the extent of the geo-fence. The geo-fence code module may be implemented with a node or edge device array 115, in which the node or edge devices 110 in the array 115 are each fitted with a Global Positioning System component to report the location of the node or edge device 110. The geo-fence code module may be configured to trigger an event on the gateway device 120 when an edge device 110 passes through a geo-fence as defined by the configuration parameters in the deployed geo-fence edge computing code module. The geo-fence code edge computing module may be used for tracking the movement of cattle over an area, for example. This may be achieved by placing an edge device 110 on each of the cattle. If a node or edge device 110 surpasses or transgresses or passes across or through a geo-fence, then the edge computing code module may generate an alert or a notification capable of transmission by the backhaul interface 388.

Similarly, other edge computing code modules providing other program code to implement arithmetic, logical, statistical or scientific operations may comprise other parameters that need to be configured before deployment of the code module. Further configuration parameters or configuration elements may include unique identifiers for each node 110. The unique identifiers for each node may enable differentiation in data received by the various nodes 110 and differentiation in the way the received data is processed by the edge computing code modules.

The code module deployment and configuration application 2720 also enables the deployment of an edge computing code module to a specific gateway device 120 based on a unique identifier for the gateway device 120. The device management application 165 stores a unique identifier for each gateway device 120 to enable directed communication between the core server 2775 and the gateway device 120. In some embodiments, gateway device 120 may be connected to a network 2770 through a network link 2735.

The network 2770 may include, for example, at least a portion of one or more networks having one or more nodes that transmit, receive, forward, generate, buffer, store, route, switch, process, or a combination thereof, one or more messages, packets, signals, or some combination thereof. The network 2770 may include, for example, one or more of: a wireless network, a wired network, an internet, an intranet, a public network, a packet-switched network, a circuit-switched network, an ad hoc network, an infrastructure network, a public-switched telephone network (PSTN), a cable network, a cellular network, a satellite network, a fibre optic network, or some combination thereof. Deployment of code modules from the core server 2775 to a gateway device 120 may occur over the network 2770 through the network link 2735.

The code module deployment and configuration application 2720 may also allow the leveraging of dependencies and interrelationships between multiple edge computing code modules to enable concerted deployment of the multiple edge computing code module to the gateway device 120. In some embodiments, multiple edge computing code modules may be configured with respect to each other to determine or generate edge data processing instructions, functions and/or logic. Multiple edge computing modules can therefore be used to generate a data processing model to support edge computing functions of the gateway device 120. In some embodiments, the edge data processing instructions, functions and/or logic may be determined or generated by a chain or group of the multiple edge computing code modules. For example, an output of a first edge computing code module may serve as an input of a second edge computing code module. This capability allows the implementation of the edge data processing instructions by using the multiple edge computing code modules as data processing building blocks. In some embodiments, the edge data processing instructions may comprise or define feedback loops based on the multiple edge computing modules. In some embodiments, the edge data processing instructions, functions and/or logic may comprise or define a finite state machine. Multiple ones or combinations of edge computing code modules can be used to generate multiple separate and/or functionally distinct data processing models or pipelines. This can result in the edge computing module of the gateway device 120 executing a first data processing model that is functionally distinct from a second data processing model. The implementation of the data processing instructions on gateway device 120 essentially transforms the computational load of information processing from centralised computing elements such as the core server 2775, to the gateway device 120, thereby implementing edge computing capability.

The edge computing capability may be especially useful in deployments of the gateway device 120 wherein one or more edge device 110 in the edge device array 115 forms part of a control system that requires instructions in response to data gathered by the rest of the edge devices 110 in the edge device array 115. The edge computing capability implemented on the gateway device 120 enables complex logical, arithmetic, statistical or scientific operations to be performed on the gateway device to generate control signals for the control systems in communication with one or more edge devices 110. The availability of edge computing capability on the gateway device 120 circumvents the need for a persistent, low latency communication link with a centralised computing or control system located remotely from the gateway device 120.

An example of a suitable practical application is a gateway device 120 configured to operate with an irrigation control system. In this example, some node or edge devices 110 of the edge device array 115 may serve as soil moisture sensors relaying information periodically to the gateway device 120 regarding soil moisture measurements. Other node or edge devices 110 may be configured to receive signals to control irrigation systems. The gateway device 120 may be configured with the edge computing capability using suitable edge computing code modules from the edge computing code module library 2710, for example an irrigation control code module with relevant parameters appropriately configured. The edge computing capability provided by the deployed edge computing code modules 2810 will enable generation of control signals to the irrigation system in response to the data gathered by node or edge devices 110 configured with soil moisture sensors. The ability to perform edge computing operations on the gateway device 120 circumvents the need to transmit data to a centralised computing or control system located remotely from the gateway device 120. This is especially beneficial in remote environments where it is not feasible to have a persistent communication link 2735.

In some embodiments, the gateway device 120 may not have persistent or continuous access to the network 2770. For example, this may be the case in gateway devices 120 positioned in remote geographical locations, such as remote mining sites, or remote agricultural land, or on container ships. In such embodiments, the deployment of code modules may occur through the satellite communication link 128.

As the satellite communication link 128 may also not be a persistent or continuously available link depending on the location of the satellite 130, deployment of edge computing code modules may occur over extended periods of time. The deployment of edge computing code modules from the core server 2775 through the satellite 130 to the gateway device 120 may be broken down into smaller discrete batches or packets that are eventually assembled together at the gateway device 120 to provide the complete program code of the code module. Data compression and encoding operations may be used during the deployment to economise the use of the satellite communication link 128.

The code module publication application 2730 allows the publication of a code module to the edge computing code module library 2710. The code module publication application 2730 may provide an interface to upload a code module to the core server 2775. The code module publication application 2730 may perform pre-publication verification of the code module to conform to publication or deployment related technical standards or guidelines. In essence, the code module publication application 2730 may allow developers of code modules to publish code modules to the edge computing code module library and make them available for deployment to one or more gateway device 120. The code module publication process may include specification of relevant input and output parameters for the code module that will ultimately allow the code module deployment and configuration application 2720 to specifically configure and deploy the code module. The code module publication process may include specification of the various configuration parameters related to a particular edge computing code module. The configuration parameters may include execution scheduling related parameters, for example.

In some embodiments, the code module publication application 2730 comprises a test suite or a series of test parameters for testing each prospective edge computing code module intended to be published and made available through the edge computing code module library 2710. The test suite may score each prospective edge computing code module based on its computation requirements, data link usage and size of the program code.

The code module library 2710, code module deployment and configuration application 2720 and the code module publication application 2730 together form part of an edge computing management module 2760. The edge computing analytics module 2760 may also be described as a nano-analytics module.

The core server 2775 comprises a user management application or module 2737. The user management application 2737 manages the accounts of users that subscribe to services provided by the core server 2775. The user management application 2737 may keep track of the number of gateway devices 120 and the number of edge devices 110 deployed by a user, for example. The user management application 2737 also keeps track of the code module libraries deployed by the user on each gateway device 120.

The core server 2775 comprises a user credit and quota management application 2740. The user credit and quota management application 2740 keeps track of the volume and frequency of data accessed by each user. In some embodiments, the user credit and quota management application 2740 may perform the function of rationing or prioritisation of the satellite communication link 128 to prioritise the downlinking and unlinking of data of a user based on the subscription level of the user or the past satellite communication link usage by the user, for example. User credit or quota may be based on tracking the total volume of data accessed by the user transmitted through the satellite 130. In some embodiments, the user credit or quota may be based on the number of edge computing code modules deployed by the user on gateway device 120.

The memory 2772 of the core server 2775, comprises a satellite data management application 2745. The satellite data management application 2745 performs the function of managing data stored on the satellite that may be made available to one or more gateway devices 120. The satellite data management application 2745 also configures satellite data communication parameters stored in memory 2772 that govern the communication between the core server 2775 and the satellite 130. The satellite data communication parameters determines aspects such as data transfer rate, throughput and prioritization of communication between the core server 2775 and the satellite 130. The data presentation and API (application programming interface) application 2750 makes data gathered by the core server 2775 available to an end user. Data received by the core server 2775 may be stored in a database 2780 accessible to the core server 2775 over a network link 2785. The database 2780 may be a relational database or a non-relational database, for example. The data presentation and API application 2750 may provide an API interface for a client device 160 to query data stored in the database 2780. In some embodiments, the API may be implemented using a REST (Representational State Transfer) API framework. In some embodiments, the API may be implemented using a MQTT (Message Queuing Telemetry Transport) protocol. The data presentation and API application 2750 may enable the viewing data stored in the database 2780 through a user interface. The user interface provided by the data presentation and API application 2750 may be accessible as a web page over the communication link 2715.

Figure 28:
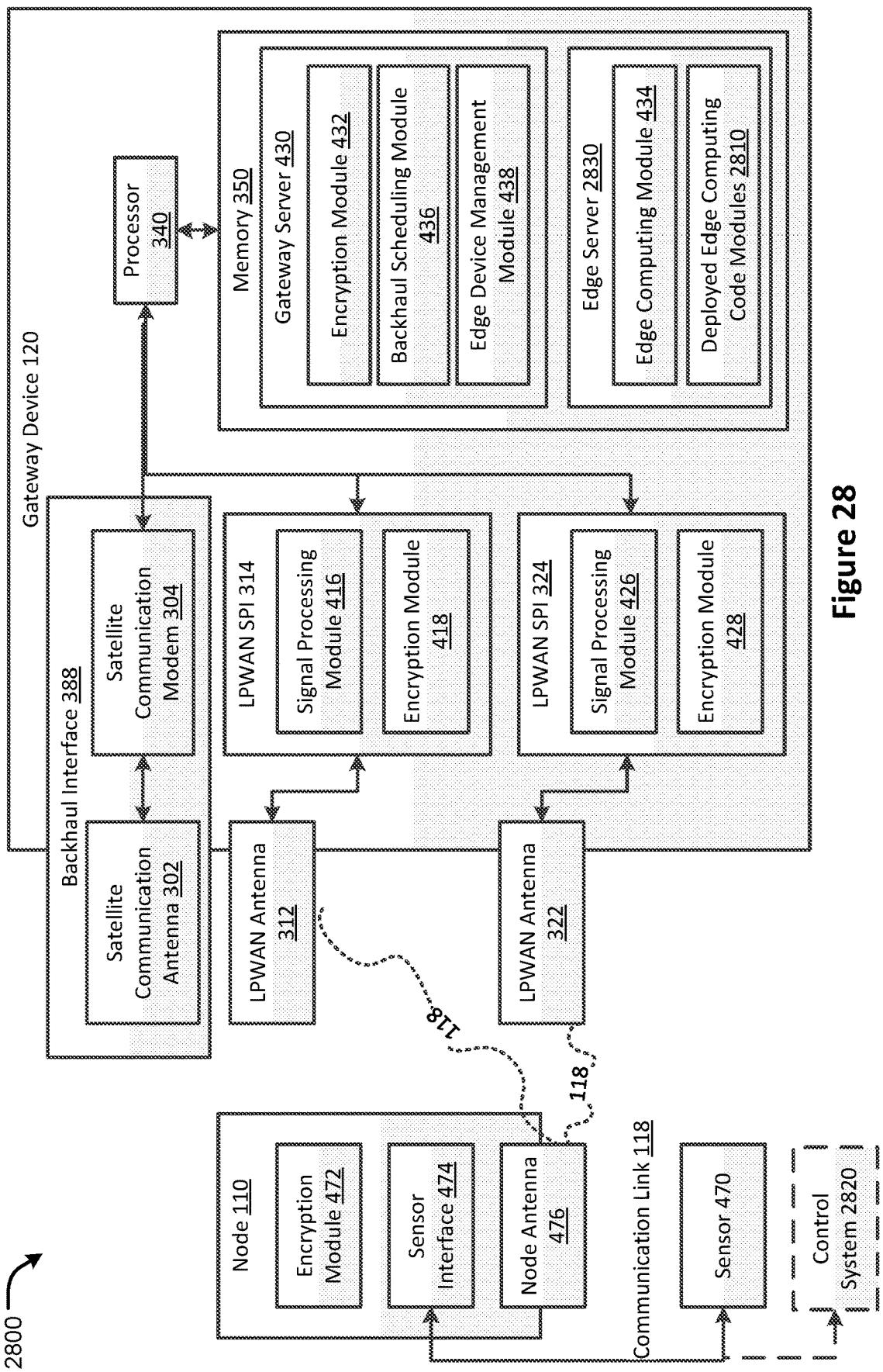
FIG. 28 is a block diagram showing logical components of a gateway device and a node or edge device according to some embodiments.

FIG. 28 is a block diagram of an edge computing system 2800 showing some of the logical components of an embodiment of the gateway device 120 implemented using the physical components shown in FIG. 3 in communication with a node or edge device 110. The gateway device 120 comprises an edge server 2830 that enables edge computing capability using the edge computing module 434 and deployed edge computing code modules 2810.

The deployed edge computing code modules 2810 comprise program code of code modules deployed to the gateway device 120 from the edge computing code module library 2710. In addition to the program code, the deployed edge computing code modules 2810 also comprises configuration parameters for each deployed edge computing code module. The edge computing module 434 invokes the deployed edge computing code modules 2810 to perform edge computing operations.

In some embodiments, the edge computing code modules comprised in the deployed edge computing code modules 2810 may be linked or chained or otherwise related together to form a data processing instructions, functions and/or logic executable by the edge server 2830. The data processing instructions, functions and/or logic may enable a series of complex chained or interlinked data processing operations by combining the various discrete edge computing code modules deployed on the gateway device 120. The linking, chaining or relationship-forming between each edge computing code module may involve one or more outputs of one edge computing code module serving as input for another edge computing code module. Alternatively, one edge computing code module may conditionally invoke one or more functions of another edge computing code module, for example.

In some embodiments, the edge device or node management module 438 may also perform the function of over-the-air device activation of edge devices or nodes 110. The edge device or node management module 438 may also perform management of network layer security and management of nodes 110 into higher level logical hierarchies or categories. The logical categorisation may allow logical bifurcation or separation of services provided by one gateway device 120 configured to operate with an edge device array 115 into separate services. This logical categorisation may allow one gateway device 120 to gather data or send control instructions with respect to two or more different problem domains. For example, gateway device 120 can be configured to track and measure soil conditions and also track and measure weather separately. In some embodiments, the edge device management module 438 may provide the capability of data packet or frame or event visualisation through the client device 160. The edge device management module 438 may manage data communication profiles for nodes or edge devices 110. The data communication profile for a node or edge device 110 may include configuration details like the activation method, suitable adaptive data rates and allocated frequency bands, for example.

The various modules or applications comprised in the gateway server 430 and the edge server 2830 communicate with each other using MQTT (Message Queuing Telemetry Transport) protocol implemented within the gateway device 120. The gateway device 120 also comprises a database 2790 to store information received from the node 110 or the core server 2775. The database 2790 may be implemented using a PostgreSQL database management system, for example. The gateway device 120 may also implement an in-memory caching service or data structures to efficiently handle data as it is received before being processed. The gateway device 120 may implement a Redis based in-memory data structure store to intermediate data processing. Log files generated by the various processes and modules executing on the gateway device 120 may be stored in persistent memory on the gateway device 120 and be made available to users through client device 160.

In some embodiments, a node or edge device 110 may be configured to communicate with a control system 2820. The control system 2820 may receive control signals from the node 110 to guide the operation of the control system, for example. The control system may be an irrigation control system or a mining or drilling machinery control system, for example.

Figure 29:
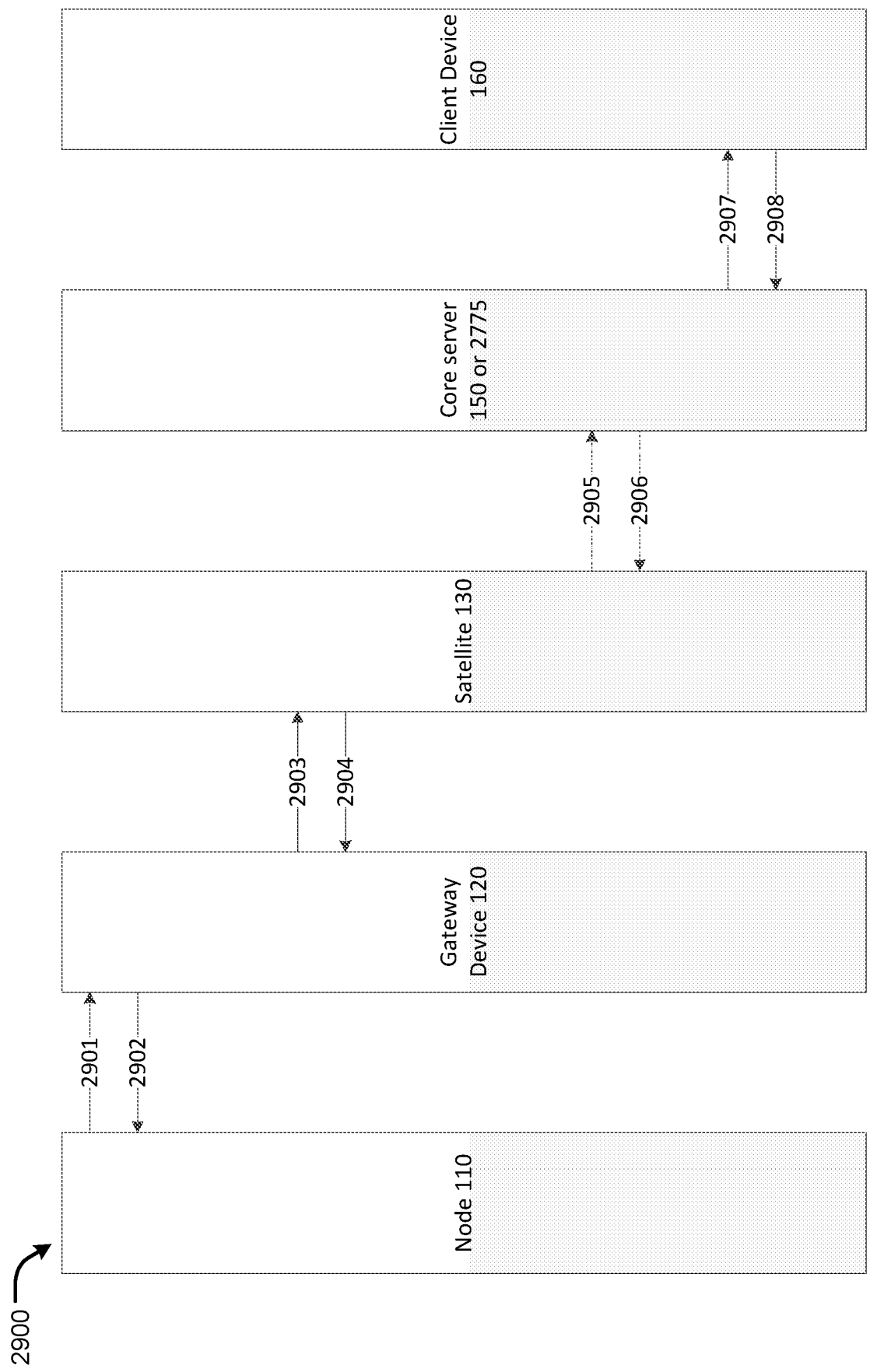
FIG. 29 is a block diagram showing flow of data packets of the remote backhaul system according to some embodiments.

FIG. 29 is a logical data flow diagram of some of the components of the remote backhaul systems 100 and 2700 of FIGS. 1 and 27 respectively. Data packet or uplink message 2901 is transmitted by the node or edge device 110 to the gateway device 120 over the communication link 118. The data packet may comprise a join request message as part of an over the air activation procedure. During the over the air activation procedure, the gateway device 120 determines a unique edge device identifier for the node or edge device 110 and encryption keys may be exchanged with the node or edge device 110. Data packet or downlink message 2902 may be transmitted from the gateway device 120 to the node or edge device 110 in response to the data packet 2901, confirming that data packet 2901 has been received. If data packet 2901 comprises a join request by the edge device 110, then data packet 2902 may comprise an acknowledgement of the join request, the unique node or edge device identifier and relevant encryption keys. Since the edge device 110 is located within a distance of approximately 5 km to 15 km of the gateway device 120, and the communication link 118 is a radio communication link, the latency of the response 2902 may be within a few microseconds once the edge device 110 is activated. The entire joining and activation procedure for a new edge device 110 in the node or edge device array 115 varies depending on several factors including: duty cycle of the node 110, a spreading factor configuration of the node 110 and size of the packet 2901. Duty cycle is measure of the percentage of units of time the node 110 is making a transmission over a period of time. Spreading factor is configuration parameter that determines the density and encoding of the signals transmitted over the communication link 118 between the node 110 and the gateway device 120. The edge device management module 438 may manage configuration parameters such as duty cycle and spreading factor for the node 110. The ease of deploying a new node or edge device 110 allows the scaling of the edge device array 115 as the need to track input data points increases in an environment.

Data transmission 2903 comprises information or data transmitted by the gateway device 120 to the satellite 130 over the communication link 128. The communication link 128 may not be persistent and in some embodiments, it may be available only for a few hours every day. Accordingly, data from node or edge device 110 such as data from data packets 2901 may be aggregated over time by the gateway device 120 to form part of the payload of the message 2903. The backhaul scheduling module 436 of the gateway device 120 manages the aggregation of data from data packets received from the edge device 110. The backhaul scheduling module 436 may perform compression and prioritization operations to efficiently use the satellite communication link 128.

In some embodiments where time series data is being gathered by one or more edge devices 110, the more recently received data may be prioritized for transmission to satellite 130 over less recently received time series data to provide greater coverage of transmitted information, for example. Data transmission 2904 from the satellite 130 confirms the receipt of information by the satellite. In some embodiments, data transmission 2904 may comprise edge computing code modules to be deployed on the gateway device 120, or software updates for the software in the gateway device 120 or software updates for the software in the edge device 110.

Data transmission 2905 comprises information or data from the satellite 130 to the core server 150 or 2775. The data transmission 2905 is intermediated through the ground station 140. Data transmission 2906 comprises a confirmation or acknowledgement of the receipt of the data packet 2905. In some embodiments, data transmission 2906 may comprise edge computing code modules for deployment on the gateway device 120. Data packet 2907 may comprise data received by the core server 2775 and directed to the client device 160 accessible through the network link 2715. Data packet or message 2908 may be a confirmation message from the client device 160 to the core server 150 or 2775. Data packet or message 2908 may also include instructions and program code for publication on the edge computing code module library 2710.

Considering the high latency of the communication link 128 between the gateway device 120 and the satellite 130, the data packets between the gateway device 120 and the satellite are specifically configured to persist for high latency communication. The duration of persistence may be longer than conventional data packets. One method of prolonging the persistence of the data packets such as 2905 and 2906 is by configuring the time to live (TTL) hop limit of such data packets. Data packets such as 2905 and 2906 may have the TTL parameters configured to enable the messages to persist for several days or months. Before a successful transmission, the data packets may be buffered within the memory of the gateway device 120 and the core server 150 or 2775. Both the gateway device 120 and the core server 150 or 2775 implement memory management policies to manage the memory buffer generated by the prolonged persistence or lifespan of the data packets.

Figure 30:
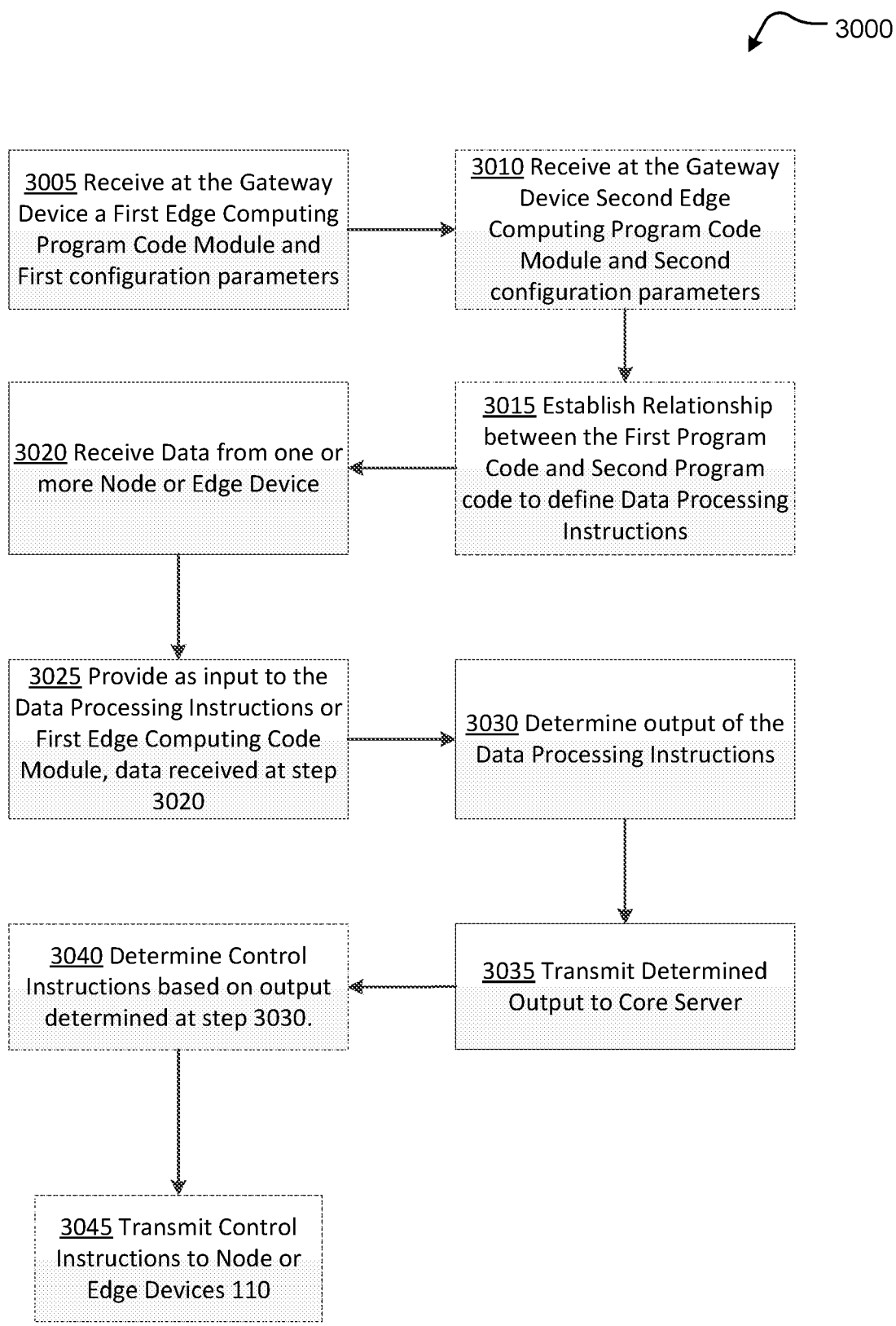
FIG. 30 is a flowchart showing some steps performed by the gateway device to provide edge computing capability.

FIG. 30 illustrates a flowchart 3000 showing some steps performed as part of the edge computing operations of a gateway device 120 according to some embodiments. At step 3005, the gateway device receives a data packet comprising a first edge computing program code module. The data packet comprising the first program code originates from the core server 2775. In some embodiments, the data packet comprising the first program code may be transmitted by over a network 2770 and the communication link 2735.

In embodiments where the gateway device 120 has no access to the network 2770 because of lack of connectivity or its remote location, a message comprising the first edge computing program code is transmitted over communication link 128 through the satellite 130. The message comprising the first edge computing program code may also comprise first configuration parameters for the first edge computing program code. The first configuration parameters determine the deployment and configuration of the first edge computing program code when it is executed on the gateway device.

Step 3010 is an optional step wherein the gateway device 120 receives a second edge computing program code. At step 3010, the gateway device may optionally receive second configuration parameters for the second edge computing program code module. The first and second program edge computing code module may comprise definitions of logical, arithmetic, statistical or scientific operations on data gathered by node or edge device 110 to produce an output, for example.

If optional step 3010 is performed, then at an optional step 3015, relationships between the first and second edge computing program code module may be established by the gateway device 120 based on the first and second program code configuration parameters received at steps 3005 and 3010. The relationships may include the output of the first edge computing code module serving as input to the second edge computing code module. Alternatively, the first edge computing code module may conditionally invoke or execute the second code module, for example. The first and second edge computing code module can be configured together to define data processing instructions, functions and/or logic to allow the edger server 2830 to process data generated by the nodes or edge devices 110 in the edge device array 115.

In some embodiments, more than two edge computing code modules may cooperate or coordinate with each other to form or provide data processing instructions, functions and/or logic. The cooperation or coordination may be in the form of one edge computing code module using as input the output produced by another, or one edge computing code module conditionally invoking another code module. In some embodiments, multiple independent data processing instructions, functions and/or logic may be defined by independent cooperation of the multiple edge computing code modules to form separate independent data processing instructions, functions and/or logic. The edge computing capability of the gateway device 120 may according be scaled with deployment of multiple edge computing code modules to form multiple data processing models to provide a wide range of data processing capabilities.

At step 3020, the gateway device 120 receives data packets from one or more nodes or edge devices 110 forming part of the node or edge device array 115. Step 3020 may occur over a prolonged period of time and as data is received from the multiple node or edge devices 110, the received data may be stored in the memory 350 of the gateway device 120. At step 3025, the data received at step 3020 is provided as input to the first edge computing code module or the data processing instructions, functions and/or logic defined at the optional step of 3015.

At step 3030, the processor 340 determines an output based on input at the step 3025 according to predefined functionality of the first edge computing code module or the data processing instructions, functions and/or logic. At step 3035, the determined output may be transmitted to the core server 150 or 2775 through the backhaul scheduling module 436 over the communication link 128 using satellite 130. Once the transmitted data is received at the core server 150, the determined output may be accessible to a client device 160 over the communication link 158.

In some embodiments, the data processing instructions, functions and/or logic or the first code module may serve to perform complex logical, arithmetic, statistical or scientific operations on data gathered by edge device 110 to produce actionable output data. In some embodiments, the actionable output data may enable determination and/or generation of control signals to one or more control systems 2820, which may be external to and/or separate from node or edge device 110. At the optional step 3040, control signals may be determined based on the output determined at step 3030. In the determination of control signals to be transmitted to the one or more control systems 2820, the functions of one or more deployed edge computing code modules 2810 may be invoked and the output determined at step 3030 may be provided as input for the step 3040. The control instructions based on the actionable output are transmitted to the control system 2820 at the optional step 3045.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A terrestrial data communication gateway device for satellite communication comprising:
   at least one processor;
   memory accessible to the at least one processor;
   a low power wide area network (LPWAN) wireless communication subsystem responsive to the at least one processor to allow wireless communication with multiple remote edge devices; and
   a satellite communication subsystem to allow wireless communication from a terrestrial location with at least one low earth orbit satellite;
   wherein the memory stores program code executable by the at least one processor to cause the at least one processor to:
      perform gateway server functions in relation to the multiple remote edge devices;

perform edge server functions, including configuring an edge computing module at the gateway device to perform data processing operations on signals received by the LPWAN wireless communication subsystem, the data processing operations comprising compression of data received by the LPWAN wireless communication subsystem to generate a compressed payload for transmission by the satellite communication subsystem;

receive from the low earth orbit satellite via the satellite communication subsystem first edge computing program code; and store in the memory the received first edge computing program code;

wherein the first edge computing program code is executable by the at least one processor to perform data processing operations on data received by the LPWAN wireless communication subsystem to determine a first edge computing program code output.

2. The gateway device of claim 1, wherein the memory stores program code executable by the at least one processor to further cause the at least one processor to configure a backhaul scheduling module to schedule communication of a transmission by the satellite communication subsystem to the low earth orbit satellite, the transmission comprising the compressed payload.

3. The gateway device of claim 2, wherein the memory is configured to buffer data received from the multiple remote edge devices before transmission by the satellite communication subsystem in the memory; and the transmission scheduled by the backhaul scheduling module comprises the data stored in the buffer in the memory.

4. The gateway device of claim 1, wherein the server functions in relation to the edge remote devices comprise one or more of:
registration of the multiple remote edge devices with the gateway device;
allocation of a communication frequency to each remote edge device;
de-duplication of data received from the multiple remote edge devices; and
implementation of a preamble, header and cyclic redundancy checks at a MAC (media access control) layer for wireless communication with the multiple remote edge devices.

5. The gateway device of claim 1, wherein the program code is executable by the at least one processor to configure an encryption module to:
encrypt data before transmissions by the LPWAN wireless communication subsystem; and
decrypt data in signals received by the LPWAN wireless communication subsystem.

6. The gateway device of claim 1, wherein the LPWAN wireless communication subsystem performs communication using a LoRaWAN protocol or a Sigfox protocol.

7. The gateway device of claim 1, wherein:
the satellite communication subsystem is configured to receive from the low earth orbit satellite first configuration parameters, store in memory the received first configuration parameters, and
the first configuration parameters are accessible by the at least one processor to determine execution of the first edge computing program code.

8. The gateway device of claim 1, wherein the satellite communication subsystem is configured to:

receive from the low earth orbit satellite via the satellite communication subsystem second edge computing program code; and store in memory the received second edge computing program code;

wherein the second edge computing program code is executable by the at least one processor to perform data processing operations on data received by the LPWAN wireless communication subsystem to determine second edge computing program code output.

9. The gateway device of claim 8, wherein the satellite communication subsystem is configured to receive second configuration parameters for the second edge computing program code, store in memory the received second configuration parameters, and
the second configuration parameters are accessible by the at least one processor to determine execution of the second edge computing program code and to determine a relationship between the first edge computing program code with the second edge computing program code.

10. The gateway device of claim 8, wherein the at least one processor is configured to determine an edge data processing function based on the relationship between the first edge computing program code and the second edge computing program code to process data received by the LPWAN wireless communication subsystem to determine an edge data processing function output.

11. The gateway device of claim 1, wherein the edge computing program code comprises one or more of a logical, arithmetic, statistical or scientific operation executable by the at least one processor with data received by the LPWAN wireless communication subsystem as an input.

12. The gateway device of claim 7, wherein:
the first edge computing program code is a geo-fencing code module,
the first configuration parameters comprise a definition of an extent of a geo-fence,
the wireless communication subsystem receives location data from the multiple remote edge devices, and
the first edge computing program code is executable by the at least one processor to determine an alert transmittable by the satellite communication subsystem on transgression of the geo-fence.

13. The gateway device of claim 1, wherein transmission by the satellite communication subsystem is configured for prolonged persistence for high latency communication.

14. A communication system including: a terrestrial gateway device, multiple edge devices located remotely from the gateway device, and one or more satellite communication systems in communication with each other, wherein the gateway device acts as an intermediate server between the one or more edge devices and the one or more satellite communication systems, the gateway device comprising:
at least one processor;
memory accessible to the at least one processor;
a low power wide area network (LPWAN) wireless communication subsystem responsive to the at least one processor to allow wireless communication with the multiple edge devices; and
a satellite communication subsystem to allow wireless communication with at least one low earth orbit satellite;
wherein the memory stores program code executable by the at least one processor to cause the at least one processor to:

perform server functions in relation to the multiple edge devices;

perform edge server functions, including configuring an edge computing module at the gateway device to perform data processing operations on signals received by the LPWAN wireless communication subsystem, the data processing operations comprising compression of data received by the LPWAN wireless communication subsystem to generate a compressed payload for transmission by the satellite communication subsystem;

receive from the low earth orbit satellite via the satellite communication subsystem first edge computing program code; and store in the memory the received first edge computing program code;

wherein the first edge computing program code is executable by the at least one processor to perform data processing operations on data received by the LPWAN wireless communication subsystem to determine a first edge computing program code output.

15. The communication system of claim 14, wherein each of the multiple edge devices comprise at least one sensor to determine an environment property of a local environment of respective edge or gateway device; and wherein each of the edge devices is configured to transmit a data packet encoding the determined environment property to the gateway device.

16. The communication system of claim 14, wherein each of the edge devices comprise at least one actuator to control a remote machine component; and the edge devices are configured to receive a data packet encoding instructions to control the remote machine component and actuate the remote machine component based on the received instructions.

17. The communication system of claim 14, further comprising a core server comprising:

at least one core server processor; and core server memory accessible to the at least one core server processor;

wherein the core server memory comprises an edge computing program code module library storing one or more edge computing program code modules, and the core server memory stores program code executable by the at least one core server processor to configure an edge computing management module to transmit the one or more edge computing program code modules to the gateway device;

wherein the edge computing management module is configured to receive program code from a client device for inclusion in the edge computing program code module library; and wherein the edge computing management module performs pre-publication verification of program code before inclusion into the edge computing program code module library.

18. A method of edge computing using a gateway device comprising at least one processor, a memory accessible to the at least one processor, a low power wide area network (LPWAN) wireless communication subsystem responsive to the at least one processor to allow wireless communication with multiple remote edge devices, and a satellite communication subsystem to allow wireless communication with at least one low earth orbit satellite, the method comprising:

by the gateway device:

performing gateway server functions in relation to multiple remote edge devices;

performing edge server functions, including configuring an edge computing module at the gateway device to perform data processing operations on signals received from the remote edge devices, the data processing operations comprising compression of data received from the remote edge devices to generate a compressed payload for transmission to a low earth orbit satellite;

receiving, at a terrestrial location, from the low earth orbit satellite, first edge computing program code;

storing in memory the received first edge computing program code; and executing the first edge computing program code to perform data processing operations on data received from at least one of the remote edge devices to determine a first edge computing program code output.

19. The method of edge computing of claim 18, further comprising:

receiving, from the low earth orbit satellite, first configuration parameters; and storing in memory the received first configuration parameters, wherein the first configuration parameters are usable to determine execution of the first edge computing program code.

20. The method of edge computing of claim 19, further comprising:

receiving, from the low earth orbit satellite, second edge computing program code;

storing in memory the received second edge computing program code; and executing the second edge computing program code to perform data processing operations on data received from at least one of the remote edge devices to determine second edge computing program code output.

* * * * *